(12) United States Patent
Yapici et al.

(10) Patent No.: US 12,375,242 B2
(45) Date of Patent: Jul. 29, 2025

(54) CHANNEL SCRAMBLING TECHNIQUES IN WIRELESS COMMUNICATIONS

(71) Applicant: QUALCOMM Incorporated, San Diego, CA (US)

(72) Inventors: Yavuz Yapici, Florham Park, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 305 days.

(21) Appl. No.: 17/707,618

(22) Filed: Mar. 29, 2022

(65) Prior Publication Data

US 2023/0318780 A1 Oct. 5, 2023

(51) Int. Cl.
*H04L 5/00* (2006.01)
*H04L 1/00* (2006.01)
*H04W 12/03* (2021.01)

(52) U.S. Cl.
CPC .......... *H04L 5/0051* (2013.01); *H04L 1/0061* (2013.01); *H04L 5/006* (2013.01); *H04W 12/03* (2021.01)

(58) Field of Classification Search
CPC ..... H04L 5/0051; H04L 1/0061; H04L 5/006; H04W 12/03
See application file for complete search history.

(56) References Cited

U.S. PATENT DOCUMENTS

| | | | |
|---|---|---|---|
| 2018/0198648 A1* | 7/2018 | Sun | H04L 5/0094 |
| 2019/0253213 A1* | 8/2019 | Garlapati | H04J 13/0029 |
| 2019/0313428 A1* | 10/2019 | Zhou | H04L 27/2602 |
| 2020/0274682 A1* | 8/2020 | Sun | H04L 5/0007 |
| 2021/0045075 A1* | 2/2021 | Manolakos | H04B 7/0626 |

* cited by examiner

*Primary Examiner* — Jianye Wu
(74) *Attorney, Agent, or Firm* — Dalei Dong; Holland & Hart LLP

(57) ABSTRACT

Methods, systems, and devices for wireless communications are described for security enhancement of physical layer communications through scrambling of transmissions using a hybrid seed to generate a scrambling sequence. The hybrid seed may be determined as a function of a measured channel characteristic of a channel between a user equipment (UE) and network entity, and channel reciprocity may be used to provide that measurements at the UE and the network entity produce the same or similar measured channel characteristics. A hybrid seed may be shared with multiple UEs, in some cases, using unique characteristics of a channel between each UE and the network entity.

30 Claims, 18 Drawing Sheets

CHANNEL SCRAMBLING TECHNIQUES IN WIRELESS COMMUNICATIONS

FIELD OF TECHNOLOGY

The following relates to wireless communications, including channel scrambling techniques in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, user privacy and data confidentiality may be provided through cryptographic functionalities that provide secure and reliable transmission protocols. Further enhancements to secure and reliable communications are desirable to provide further security robustness and reliability of wireless communications.

SUMMARY

The described techniques relate to improved methods, systems, devices, and apparatuses that support channel scrambling techniques in wireless communications. In accordance with various aspects, the described techniques provide for security enhancement of physical layer communications through scrambling transmissions using a hybrid seed to generate a scrambling sequence. In some cases, the hybrid seed may be determined as a function of a measured channel characteristic of a channel between a user equipment (UE) and network entity, and channel reciprocity may be used to provide that measurements at the UE and the network entity produce the same or similar measured channel characteristics. A hybrid seed may be shared with multiple UEs, in some cases, using unique characteristics of a channel between each UE and the network entity. In some cases, a UE that desires to obtain the hybrid seed may transmit a first communication based on a random phase offset. The network entity that receives the communication may measure a phase rotation of the first communication, add a phase offset as a function of the hybrid seed, and transmit a second communication back to the UE using the determined phase offset. The receiving UE may determine the phase offset based on the random phase offset used for the first communication, and then determine the hybrid seed based on the function of the phase offset.

A method for wireless communication at a user equipment (UE) is described. The method may include measuring a physical layer channel characteristic of a wireless channel used for communications between the UE and a network entity, determining a hybrid seed for the communications between the UE and a network entity, where the hybrid seed is a function of the measured physical layer channel characteristic of the wireless channel between the UE and the network entity, generating a scrambling sequence for the communications based on the hybrid seed, and receiving at least a first communication based on the scrambling sequence.

An apparatus for wireless communication at a UE is described. The apparatus may include a processor, memory coupled with the processor, and instructions stored in the memory. The instructions may be executable by the processor to cause the apparatus to measure a physical layer channel characteristic of a wireless channel used for communications between the UE and a network entity, determine a hybrid seed for the communications between the UE and a network entity, where the hybrid seed is a function of the measured physical layer channel characteristic of the wireless channel between the UE and the network entity, generate a scrambling sequence for the communications based on the hybrid seed, and receive at least a first communication based on the scrambling sequence.

Another apparatus for wireless communication at a UE is described. The apparatus may include means for measuring a physical layer channel characteristic of a wireless channel used for communications between the UE and a network entity, means for determining a hybrid seed for the communications between the UE and a network entity, where the hybrid seed is a function of the measured physical layer channel characteristic of the wireless channel between the UE and the network entity, means for generating a scrambling sequence for the communications based on the hybrid seed, and means for receiving at least a first communication based on the scrambling sequence.

A non-transitory computer-readable medium storing code for wireless communication at a UE is described. The code may include instructions executable by a processor to measure a physical layer channel characteristic of a wireless channel used for communications between the UE and a network entity, determine a hybrid seed for the communications between the UE and a network entity, where the hybrid seed is a function of the measured physical layer channel characteristic of the wireless channel between the UE and the network entity, generate a scrambling sequence for the communications based on the hybrid seed, and receive at least a first communication based on the scrambling sequence.

In some examples of the method, apparatuses, and non-transitory computer-readable medium described herein, the receiving at least the first communication may include operations, features, means, or instructions for decoding one or more of a control channel payload or a demodulation reference signal (DMRS) based on the scrambling sequence that is generated from the hybrid seed. In some examples of the method, apparatuses, and non-transitory computer-readable medium described herein, the generating the scrambling sequence may include operations, features, means, or instructions for identifying one or more upper layer initialization parameters (S) associated with the scrambling sequence and generating the scrambling sequence based on a function of the upper layer initialization parameters and the hybrid seed.

In some examples of the method, apparatuses, and non-transitory computer-readable medium described herein, the one or more upper layer initialization parameters include a scrambling ID of the UE, a physical cell identification (PCID), or any combinations thereof, and where the measured physical layer channel characteristic is measured separately at the UE and at the network entity and channel reciprocity of the wireless channel provides that both the UE and the network entity obtain a same hybrid seed. Some examples of the method, apparatuses, and non-transitory computer-readable medium described herein may further include operations, features, means, or instructions for determining, responsive to an indication from the network entity or a timer expiration, a new scrambling sequence based on an updated physical layer channel characteristic measurement and associated determined hybrid seed.

In some examples of the method, apparatuses, and non-transitory computer-readable medium described herein, the measuring the physical layer channel characteristic of the wireless channel uses a downlink reference signal associated with hybrid seed determination, and where the UE transmits an uplink reference signal to the network entity within a channel coherence time for determination of the hybrid seed at the network entity. In some examples of the method, apparatuses, and non-transitory computer-readable medium described herein, the measured physical layer channel characteristic may be one or more of a phase measurement, a received signal strength, an angle-of-arrival (AoA), an angle of departure (AoD), a measured channel matrix, or any combinations thereof.

A method for wireless communication at a UE is described. The method may include transmitting a first communication to a network entity via a physical layer channel using a first phase offset value, receiving a second communication responsive to the first communication, the second communication transmitted using a second phase offset value that is based on a discrete phase offset value and an estimation of the first phase offset value, where the discrete phase offset value is a function of a hybrid seed used for scrambling communications on the physical layer channel, determining the discrete phase offset value based at least in part on a measured phase of the second communication and the first phase offset value, generating a scrambling sequence for the communications on the physical channel based on the hybrid seed, where the hybrid seed is determined based on the discrete phase offset value and the function, and receiving at least a third communication based on the scrambling sequence.

An apparatus for wireless communication at a UE is described. The apparatus may include a processor, memory coupled with the processor, and instructions stored in the memory. The instructions may be executable by the processor to cause the apparatus to transmit a first communication to a network entity via a physical layer channel using a first phase offset value, receive a second communication responsive to the first communication, the second communication transmitted using a second phase offset value that is based on a discrete phase offset value and an estimation of the first phase offset value, where the discrete phase offset value is a function of a hybrid seed used for scrambling communications on the physical layer channel, determine the discrete phase offset value based at least in part on a measured phase of the second communication and the first phase offset value, generate a scrambling sequence for the communications on the physical channel based on the hybrid seed, where the hybrid seed is determined based on the discrete phase offset value and the function, and receive at least a third communication based on the scrambling sequence.

Another apparatus for wireless communication at a UE is described. The apparatus may include means for transmitting a first communication to a network entity via a physical layer channel using a first phase offset value, means for receiving a second communication responsive to the first communication, the second communication transmitted using a second phase offset value that is based on a discrete phase offset value and an estimation of the first phase offset value, where the discrete phase offset value is a function of a hybrid seed used for scrambling communications on the physical layer channel, means for determining the discrete phase offset value based at least in part on a measured phase of the second communication and the first phase offset value, means for generating a scrambling sequence for the communications on the physical channel based on the hybrid seed, where the hybrid seed is determined based on the discrete phase offset value and the function, and means for receiving at least a third communication based on the scrambling sequence.

A non-transitory computer-readable medium storing code for wireless communication at a UE is described. The code may include instructions executable by a processor to transmit a first communication to a network entity via a physical layer channel using a first phase offset value, receive a second communication responsive to the first communication, the second communication transmitted using a second phase offset value that is based on a discrete phase offset value and an estimation of the first phase offset value, where the discrete phase offset value is a function of a hybrid seed used for scrambling communications on the physical layer channel, determine the discrete phase offset value based at least in part on a measured phase of the second communication and the first phase offset value, generate a scrambling sequence for the communications on the physical channel based on the hybrid seed, where the hybrid seed is determined based on the discrete phase offset value and the function, and receive at least a third communication based on the scrambling sequence.

In some examples of the method, apparatuses, and non-transitory computer-readable medium described herein, the first phase offset value may be selected randomly from range of available phase offset values, a beam used to transmit the first communication may be selected randomly from a set of available beams, or any combinations thereof, for each instance of a transmission of the first communication to the network entity. In some examples of the method, apparatuses, and non-transitory computer-readable medium described herein, the determining the discrete phase offset value may include operations, features, means, or instructions for measuring a received phase of the second communication, determining a difference between the received phase and the first phase offset value, and determining the discrete phase offset value based on the difference between the received phase and the first phase offset value. In some examples of the method, apparatuses, and non-transitory computer-readable medium described herein, the second communication may be transmitted via a set of multiple frequency domain tones, and provides a discrete phase offset that may be quantized by a set of multiple bits.

Some examples of the method, apparatuses, and non-transitory computer-readable medium described herein may further include operations, features, means, or instructions for estimating an error of channel phase measurements for the physical layer channel and suspending communications based on the hybrid seed when the error of channel phase measurements exceeds a threshold value. Some examples of the method, apparatuses, and non-transitory computer-readable medium described herein may further include operations, features, means, or instructions for performing a cyclic redundancy check (CRC) on a payload of the second communication based on the scrambling sequence and transmitting a negative acknowledgment to the network entity responsive to a failure of the CRC.

A method for wireless communication at a network entity is described. The method may include measuring a physical layer channel characteristic of a wireless channel used for communications with a first UE, determining a hybrid seed for the communications with the first UE, where the hybrid seed is a function of the measured physical layer channel characteristic of the wireless channel between the first UE and the network entity, generating a scrambling sequence for the communications based on the hybrid seed, and transmitting at least a first communication that is scrambled by the scrambling sequence.

An apparatus for wireless communication at a network entity is described. The apparatus may include a processor, memory coupled with the processor, and instructions stored in the memory. The instructions may be executable by the processor to cause the apparatus to measure a physical layer channel characteristic of a wireless channel used for communications with a first UE, determine a hybrid seed for the communications with the first UE, where the hybrid seed is a function of the measured physical layer channel characteristic of the wireless channel between the first UE and the network entity, generate a scrambling sequence for the communications based on the hybrid seed, and transmit at least a first communication that is scrambled by the scrambling sequence.

Another apparatus for wireless communication at a network entity is described. The apparatus may include means for measuring a physical layer channel characteristic of a wireless channel used for communications with a first UE, means for determining a hybrid seed for the communications with the first UE, where the hybrid seed is a function of the measured physical layer channel characteristic of the wireless channel between the first UE and the network entity, means for generating a scrambling sequence for the communications based on the hybrid seed, and means for transmitting at least a first communication that is scrambled by the scrambling sequence.

A non-transitory computer-readable medium storing code for wireless communication at a network entity is described. The code may include instructions executable by a processor to measure a physical layer channel characteristic of a wireless channel used for communications with a first UE, determine a hybrid seed for the communications with the first UE, where the hybrid seed is a function of the measured physical layer channel characteristic of the wireless channel between the first UE and the network entity, generate a scrambling sequence for the communications based on the hybrid seed, and transmit at least a first communication that is scrambled by the scrambling sequence.

Some examples of the method, apparatuses, and non-transitory computer-readable medium described herein may further include operations, features, means, or instructions for encoding one or more of a control channel payload or a DMRS of the first communication based on the scrambling sequence that is generated from the hybrid seed. In some examples of the method, apparatuses, and non-transitory computer-readable medium described herein, the generating the scrambling sequence may include operations, features, means, or instructions for identifying one or more upper layer initialization parameters of the first UE that are associated with the scrambling sequence and generating the scrambling sequence based on a function of the upper layer initialization parameters and the hybrid seed. In some examples of the method, apparatuses, and non-transitory computer-readable medium described herein, the one or more upper layer initialization parameters include a scrambling ID of the first UE, a PCID associated with the network entity, or any combinations thereof, and where the measured physical layer channel characteristic is measured separately at the first UE and at the network entity and channel reciprocity of the wireless channel provides that both the first UE and the network entity obtain a same hybrid seed. In some examples of the method, apparatuses, and non-transitory computer-readable medium described herein, the measured physical layer channel characteristic may be one or more of a phase measurement, a received signal strength, an AoA, an AoD, a measured channel matrix, or any combinations thereof.

Some examples of the method, apparatuses, and non-transitory computer-readable medium described herein may further include operations, features, means, or instructions for sharing the hybrid seed with at least a second UE. In some examples of the method, apparatuses, and non-transitory computer-readable medium described herein, the sharing may include operations, features, means, or instructions for measuring a first phase offset value of a second communication from the second UE, determining a discrete phase offset value as a function of the hybrid seed, and transmitting, to the second UE, a third communication using a second phase offset value that is based on a discrete phase offset value and the measured first phase offset value. In some examples of the method, apparatuses, and non-transitory computer-readable medium described herein, the third communication may be transmitted via a set of multiple frequency domain tones, and provides a discrete phase offset that is quantized by a set of multiple bits.

Some examples of the method, apparatuses, and non-transitory computer-readable medium described herein may further include operations, features, means, or instructions for estimating an error of channel phase measurements for the wireless channel and suspending communications based on the hybrid seed when the error of channel phase measurements exceeds a threshold value. Some examples of the method, apparatuses, and non-transitory computer-readable medium described herein may further include operations, features, means, or instructions for determining an CRC value of a payload of the first communication based on the scrambling sequence, appending the CRC value to the payload of the first communication, and retransmitting the first communication responsive to an associated negative acknowledgment received from the first UE.

DETAILED DESCRIPTION

Figure 1:
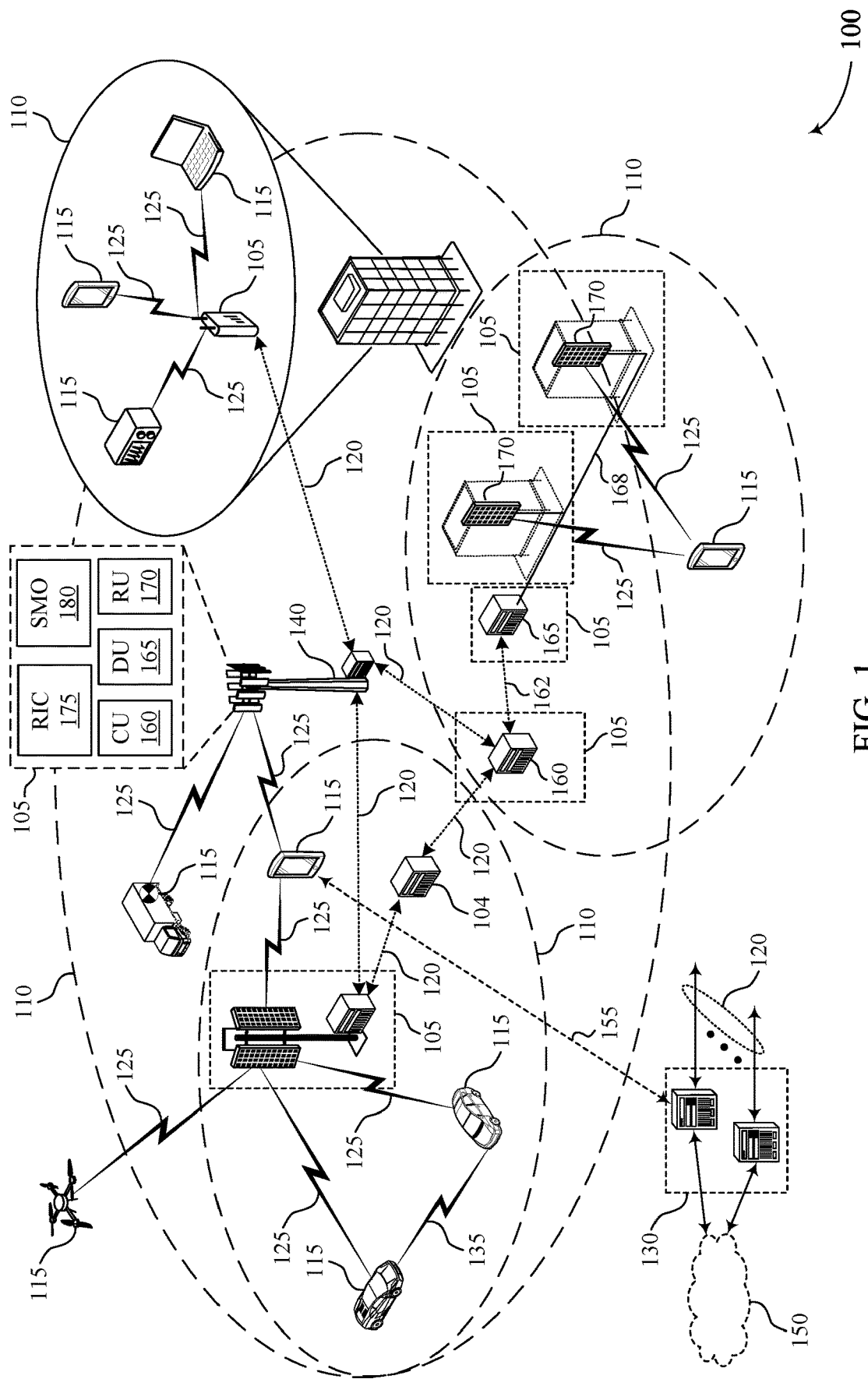
FIG. 1 illustrates an example of a wireless communications system that supports channel scrambling techniques in wireless communications in accordance with one or more aspects of the present disclosure.

Various wireless communications systems, such as 4G and 5G wireless communications systems, provide encryption for upper layer communications (application layer communications) through upper-layer cryptographic functionalities. Such encryption provides for secure end-to-end data communications via wireless networks. However, similar protections are not available for physical layer channels, such as for physical downlink control channel (PDCCH) transmissions, which may provide downlink control information (DCI) and various parameters for communications functionalities at the physical layer. Such reduced protections may make such physical layer communications vulnerable to a malicious attack that may target the physical layer communications and provide fake PDCCH packets that may disrupt communications in a network through interference with channel decoding parameters, power parameters, modem on/off state parameters, and the like. In some other examples, a malicious node may capture the PDCCH packet and obtain the enclosed DCI. In some cases, devices may use scrambling of PDCCH payload with a physical cell identification (PCI) which has 1008 possibilities, or with a configured scrambling identification (e.g., pdcch-DMRS-ScramblingID) such as a 16 bit ID for 65,536 possibilities. In either case, while upper layer communications remain protected by encryption, the physical layer scrambling may be susceptible to brute-force attacks, and more secure physical layer communications may be desirable in order to enhance the security of wireless communications and prevent attacks that can impact network availability and utilization (e.g., via obtaining DCI from captured PDCCH packets).

In accordance with various aspects, the present disclosure provides security enhancement techniques for physical layer communications through scrambling transmissions using a hybrid seed to generate a scrambling sequence. In some cases, the hybrid seed may be determined as a function of a measured channel characteristic of a channel between a user equipment (UE) and network entity. Channel reciprocity may be used to provide that measurements at the UE and the network entity produce the same or similar measured channel characteristics, such that the function to determine the hybrid seed will yield the same result at both the UE and the network entity. Thus, the value of the hybrid seed is not transferred over the public (i.e., unencrypted) channel, and is not easily detectable because the channel between the devices is unique.

In some cases, for DCI payload that is transmitted to multiple different UEs, the hybrid seed can be shared among UEs using unique characteristics of a channel between each UE and the network entity. In some cases, a UE that desires to obtain the hybrid seed may transmit a first communication based on a random phase offset. The network entity that receives the communication may measure a phase rotation of the first communication. A phase offset may be determined as a function of the hybrid seed and added to the measured phase rotation, which is used to transmit a second communication back to the UE. The UE may determine the phase offset based on the random phase offset used for the first communication, and then determine the hybrid seed based on the function of the phase offset.

Such techniques may enhance communication security for wireless networks and help ensure availability of network services (e.g., against denial attacks) through physical layer communications scrambling based on hybrid seeds. Such a hybrid scrambling sequence generation techniques may provide physical layer security for PDCCH (e.g., for DCI types addressing either single or multiple UEs) by providing additional randomness (e.g., unguessibility) to the scrambling operation through the uniqueness of the underlying physical layer channel.

Aspects of the disclosure are initially described in the context of wireless communications systems. Examples of hybrid seed determination and scrambling using hybrid seeds are then discussed. Aspects of the disclosure are further illustrated by and described with reference to apparatus diagrams, system diagrams, and flowcharts that relate to channel scrambling techniques in wireless communications.

FIG. 1 illustrates an example of a wireless communications system 100 that supports channel scrambling techniques in wireless communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support channel scrambling techniques in wireless communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1: M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

In some cases, security enhancement of physical layer communications may be provided through scrambling transmissions using a hybrid seed to generate a scrambling sequence. In some cases, the hybrid seed may be determined as a function of a measured channel characteristic of a channel between a UE 115 and network entity 105, and channel reciprocity may be used to provide that measurements at the UE 115 and the network 105 entity produce the same or similar measured channel characteristics. A hybrid seed may be shared with multiple UEs 115, in some cases, using unique characteristics of a channel between each UE 115 and the network entity 105. In some cases, a UE 115 that desires to obtain the hybrid seed may transmit a first communication based on a random phase offset. The network entity 105 that receives the communication may measure a phase rotation of the first communication, add a phase offset as a function of the hybrid seed, and transmit a second communication back to the UE 115 using the determined phase offset. The receiving UE 115 may determine the phase offset based on the random phase offset used for the first communication, and then determine the hybrid seed based on the function of the phase offset.

Figure 2:
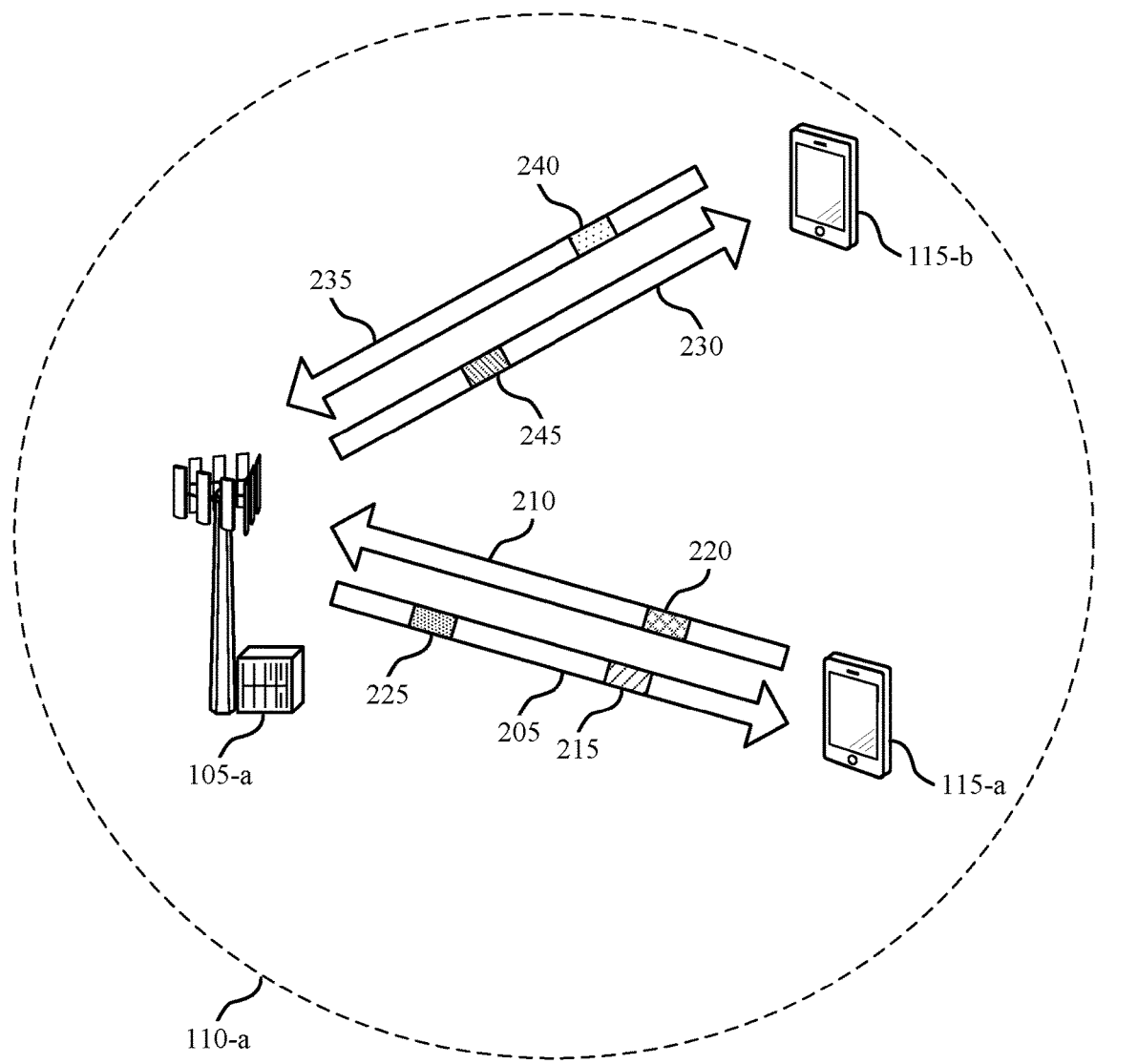
FIG. 2 illustrates an example of a portion of a wireless communications system that supports channel scrambling techniques in wireless communications in accordance with one or more aspects of the present disclosure.

FIG. 2 illustrates an example of a wireless communications system 200 that supports channel scrambling techniques in wireless communications in accordance with one or more aspects of the present disclosure. In some examples, wireless communications system 200 may implement aspects of wireless communication system 100 and may include first UE 115-a, second UE 115-b, and a network entity 105-a with coverage area 110-a. Network entity 105-a and UEs 115 may be examples of UEs 115 and network entities 105 as described with reference to FIG. 1.

In some examples, the first UE 115-a and the network entity 105-a may communicate using one or more downlink carriers 205 and one or more uplink carriers 210. Similarly, the second UE 115-b and the network entity 105-a may communicate using one or more downlink carriers 230 and one or more uplink carriers 235. In accordance with various aspects described herein, physical layer communications may be transmitted between UEs 115 and network entity 105-a, where the physical layer communications are scrambled using a hybrid seed to generate a scrambling sequence. The hybrid seed may be based on a scrambling ID associated with the first UE 115-a, and as a function of a measured channel characteristic of a channel between the first UE 115-a and the network entity 105-a. Channel reciprocity may be used to provide that measurements at the first UE 115-a and the network entity 105-a produce the same or similar measured channel characteristics, such that the function to determine the hybrid seed will yield the same result at both the first UE 115-a and the network entity 105-a. Thus, the value of the hybrid seed is not transferred over the channel, and is not easily detectable because the channel between the devices is unique.

In some cases, the network entity 105-a may transmit a downlink reference signal 215 that is measured at the first UE 115-a to determine the measured channel characteristic. The first UE 115-a may transmit uplink reference signal 220 that is measured at the network entity 105-a to determine the measured channel characteristic. In some cases, the downlink reference signal 215 and the uplink reference signal 220 may be transmitted within a channel coherence time to help ensure channel reciprocity.

In some cases, after establishment of the hybrid seed, the network entity 105-a may transmit a PDCCH 225-a transmission that may include a DCI payload scrambled with the hybrid seed. In some cases, the hybrid seed can be shared with the second UE 115-b using unique characteristics of the channel between the second UE 115-b and the network entity 105-a. In some cases, the second UE 115-b that desires to obtain the hybrid seed may transmit an uplink signal 240 that includes a first communication based on a random phase offset. The network entity 105-a may receive the uplink signal 240 and measure a phase rotation. A phase offset may be determined as a function of the hybrid seed and added to the measured phase rotation, which is used to transmit downlink signal 245 that includes a second communication back to the second UE 115-b. The second UE 115-b may determine the phase offset based on the random phase offset used for the first communication, and then determine the hybrid seed based on the function of the phase offset. In some cases, after sharing of the hybrid seed, the network entity 105-a may transmit a PDCCH 225-b transmission that may include a DCI payload that is scrambled with the hybrid seed.

Such techniques may enhance security and reliability of wireless communications by reducing the likelihood that an adversary may interfere with communications, such as by producing fake PDCCH packets, which pose threat on correct implementation of various functionalities including shared channel decoding, adjusting uplink power, and keeping a UE 115 receiver in the correct state (e.g., ON/OFF) while monitoring PDCCH. Techniques as discussed herein provide security with PDCCH 225 transmissions that have physical layer security protection that uses hybrid-seed for scrambling sequence generation for both the PDCCH payload and respective demodulation reference signal (DMRS) transmissions. In some cases, as discussed, the hybrid seed may be based on a channel-response based secret which is known only by the network entity 105-a and the UEs 115. The resulting scrambling sequence may not be able to be regenerated locally by an adversary which thereby enhanced secrecy of the PDCCH 225 transmission.

In some cases, the scrambling sequence for any PDCCH 225 block (e.g., DCI payload+DMRS) referencing either single or multiple UEs 115 is initialized with a hybrid seed which is composed of an initialization parameter (e.g., an upper layer initialization parameter such as pdcch-DMRS-ScramblingID or physical cell ID (PCID)) and channel-response-based secret known only by the network entity 105-a and the UEs 115 referenced within the PDCCH 225. Scrambling may be carried out using the same unique sequence produced by the UEs 115 and network entity 105-a separately, the scrambling sequence generated by using a function $f(\cdot)$ which is known to both the network entity 105-a and UEs 115 (e.g., modulation function). In some cases, the function is based on the initialization parameter S and channel-response-based secret K. In some cases, S may be based on the upper-layer parameter pdcch-DMRS-ScramblingID or PCID, and K may be generated by the network entity 105-a and UEs 115 locally, without exchanging it over public (e.g., unencrypted) channels, based on the measurements of the first UE 115-a and the network entity 105-a. Because the channel between network entity 105-a and first UE 115-a is unique to this transmit-receive pair and random (e.g., due to fading), it acts as a source of common randomness in generating random secret K. Since K is not known by adversaries, the number of possibilities that any adversary must try (i.e., to find the correct scrambling sequence) will increase along with the size of K. Further, any public information on the function $f(\cdot)$ does not impair the security performance as the secrecy of the scrambling sequence depends on the randomness of the channel (not on the secrecy of $f(\cdot)$).

In some cases, to obtain the channel-response-based secret K, the following procedure may be performed. When there is any need to generate a new scrambling sequence, the channel between network entity 105-a and the first UE 115-a may be estimated. In some cases, the network entity 105-a may transmit an indication to the first UE 115-a (e.g., a bit or flag in DCI) to initiate a new scrambling sequence. In some cases, the network entity 105-a may configure UEs 115 beforehand to generate a new scrambling sequence whenever a timer expires (e.g., a timer that is a function of the lifetime of not only the scrambling sequence but also that of K). In some cases, the timer may be configured dynamically by the network entity 105-a (e.g., based on the channel variations). The first UE 115-a then estimates its channel with network entity 105-a by using a downlink reference signal 215 transmitted by network entity 105-a (e.g., a DMRS), and sends uplink reference signal 220 (e.g., sounding RS (SRS)) back to the network entity 105-a. The first UE 115-a sends the uplink reference signal 220 within a time period no longer than the channel coherence time to ensure both the network entity 105-a and first UE 115-a are using the "same" channel realization. The network entity 105-a estimates the channel between the first UE 115-a based on the uplink reference signal 220. The network entity 105-a and the first UE 115-a estimate one or more channel parameters (e.g., phase, received signal strength (RSS), angle-of arrival or departure (AoA/AoD), or channel matrix directly). The network entity 105-a then produces the channel-response-based secret K as the output of a function which accepts one or more of the individual channel measurements as the inputs. The network entity 105-a, in some cases, may securely share the parameter K with other UEs, such as the second UE 115-b. In some cases, if the parameter K is produced by using only one UE's channel measurement, then the network entity 105-a does not send this parameter back to that UE (as it is already known). While FIG. 2 illustrates just the first UE 115-a that is used to estimate a channel to obtain the parameter K, in other cases the network entity 105-a may determine the parameter K based on measurements of multiple UEs 115, and may share this parameter securely using sharing techniques as discussed herein. In other cases, the network entity 105-a may use just the first UE 115-a to determine the parameter and share the parameter with one or more other UEs 115, such as second UE 115-b, if PDCCH 225 transmissions are to be decoded by multiple UEs 115. In still other cases, the network entity 105-a may establish multiple different hybrid seeds with multiple different UEs 115 in accordance with techniques discussed herein.

For the network entity 105-a to share the parameter K with an arbitrary UE 115 securely, the following procedure may be performed. This example is discussed with reference to the second UE 115-b and network entity 105-a in FIG. 2, although multiple other UEs 115 may use such a shared hybrid seed. In this example, the second UE 115-b may transmit a random phase $\varphi_m$ in uplink signal 240 to the network entity 105-a, which is only known by the second UE 115-b, and each different UE 115 that receives the shared parameter picks up a different phase $\varphi_m$ and/or sends it over a different beam each time it needs to learn the parameter K. The network entity 105-a receives the transmitted phase as $\theta_g = \varphi_m + \theta_{m2g}$ where $\theta_{m2g}$ is the phase rotation due to the RF front-end and propagation over channel, and measured as $\hat{\theta}_g$. The parameter K may be modulated at the network entity 105-a by a function to obtain the discrete phase $\phi$, which is then transmitted back to the second UE as $\phi - \hat{\theta}_g$ in downlink signal 245. Even if an adversary measures the transmitted phase $\phi - \hat{\theta}_g$, it is unable to learn the phase $\phi$ (and hence the parameter K) since it does not know $\hat{\theta}_g$, which is a unique measurement at the network entity 105-a. The second UE 115-b receives the phase as $\phi - \hat{\theta}_g + \theta_{g2m}$ which boils down to $\phi - \varphi_m$ by channel reciprocity between uplink and downlink, and accordingly obtains $\phi$ and learn parameter K, since the second UE 115-b already knows random phase $\varphi_m$.

If the phase parameter ϕ is multiple-bits long, multiple frequency tones may be used in frequency domain for transmission. Due to any channel non-reciprocity (e.g., due to RF front-end calibration errors between the downlink and uplink) and error in estimating channel phase response, the measured ϕ−φ$_m$ might not be exactly equal to the actual one. For example, the transmit-receive pair may periodically exchange a probing packet set with a known phase parameter ϕ to quantify the error associated with the estimate for ϕ−φ$_m$. If the measured error is below a threshold, which might be set by dynamically or statically, transmission of K via the described sharing method is allowed, and is otherwise sharing may be suspended (e.g., for a preconfigured time period). In an example, the network entity 105-*a* may append a cyclic redundancy check (CRC) to the phase parameter ϕ (e.g., using additional tones in the frequency domain) to enable the second UE 115-*b* to verify the accuracy of the received phase parameter and hence K, or otherwise send a negative acknowledgment (NACK). If the network entity 105-*a* receives no NACK, then it assumes the second UE 115-*b* learned the parameter K correctly. If the network entity 105-*a* receives a NACK, it might either try resharing it following the same procedure, or suspend the transmission of the parameter K (e.g., for a preconfigured time period). Such techniques may provide hybrid-seed-based scrambling sequence that can be used either for PDCCH payload or DMRS sequence, or for both, or for any message transmission involving scrambling operations. Example scrambling sequence generation and processing for PDCCH and DMRS are discussed with reference to FIGS. 3 and 4.

Figure 3:
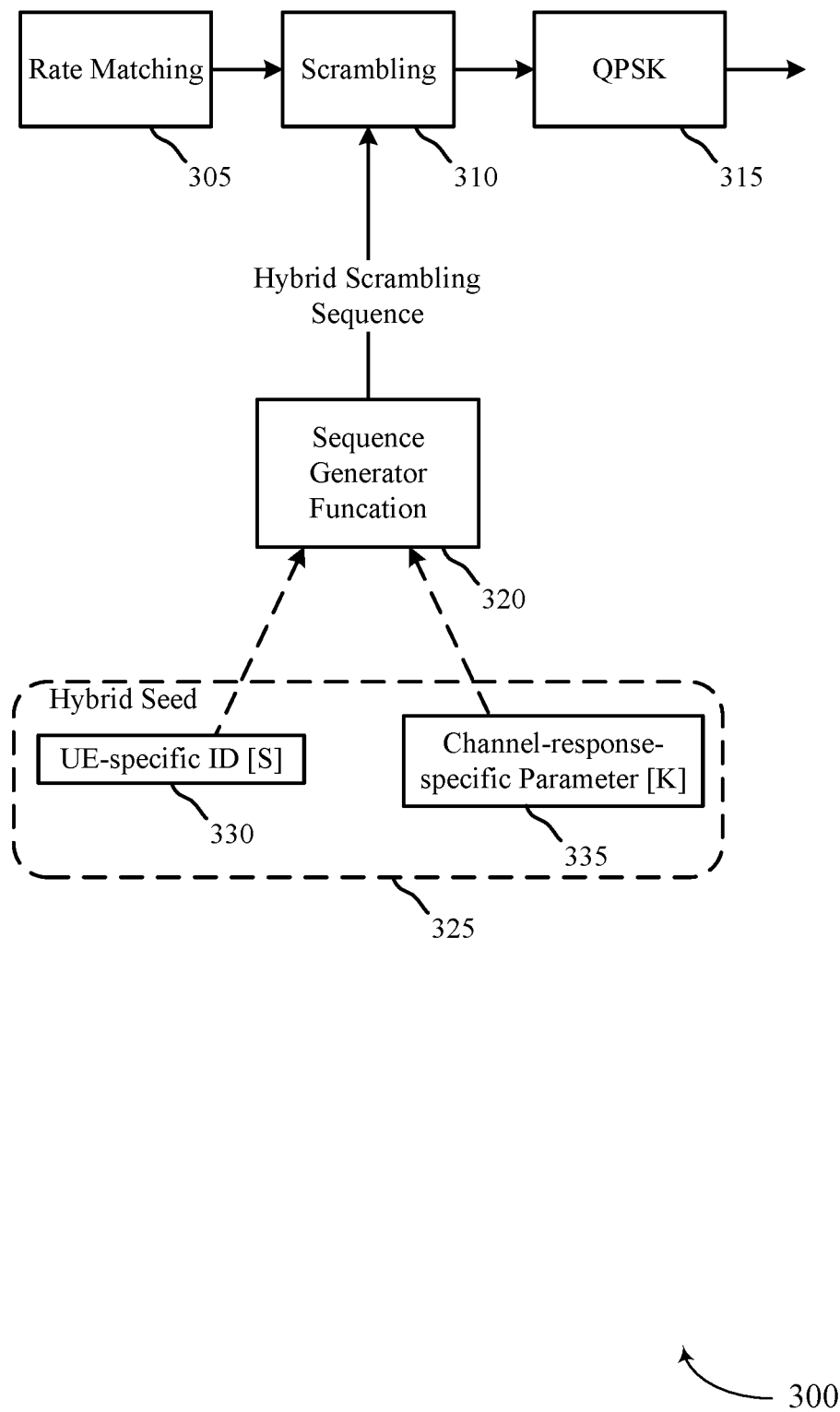
FIG. 3 illustrates an example of hybrid seed based scrambling that supports channel scrambling techniques in wireless communications in accordance with one or more aspects of the present disclosure.

FIG. 3 illustrates an example of a hybrid seed based scrambling 300 for a physical channel payload that supports channel scrambling techniques in wireless communications in accordance with one or more aspects of the present disclosure. In some examples, hybrid seed based scrambling 300 may implement aspects of wireless communication system 100 and wireless communications system 200. For example, hybrid seed based scrambling 300 may be implemented by a UE 115 and a network entity 105 as described with reference to FIGS. 1 and 2.

In this example, a transmitter (e.g., a network entity or UE), and a receiver (e.g., a UE or network entity), may perform signal processing based on the described scrambling sequence. For example, when transmitting a PDCCH (or other physical layer transmission), rate matching 305 may be performed to encode payload bits according to a modulation and coding scheme for transmission. The rate matched information may be scrambled according to a scrambling 310 function, and provided to a modulation block such as QPSK 315 block for modulation and then transmission via transmit circuitry (e.g., amplifiers, antennas, etc.). The scrambling 310 function may be based on a hybrid seed scrambling sequence provided by sequence generator function 320. In various aspects, the sequence generator function 320 may receive hybrid seed inputs 325, such as channel response-specific parameter 335 (K) and a UE-specific ID 330 (S). As discussed herein, the UE-specific ID 330 (S) may be, for example, a PCID (e.g., having 1008 possibilities), or a pdcch-DMRS-ScramblingID (e.g., a 16 bit ID for $2^{16}$=65,536 possibilities). The channel response-specific parameter 335 (K) may be an n-bit parameter (i.e., having $2^n$ possibilities). Such techniques may provide a hybrid scrambling sequence that is, for example, at least 31 bits long, which may provide a robust sequence that is less susceptible to brute force attacks than a scrambling sequence based on a UE-specific parameter alone.

Figure 4:
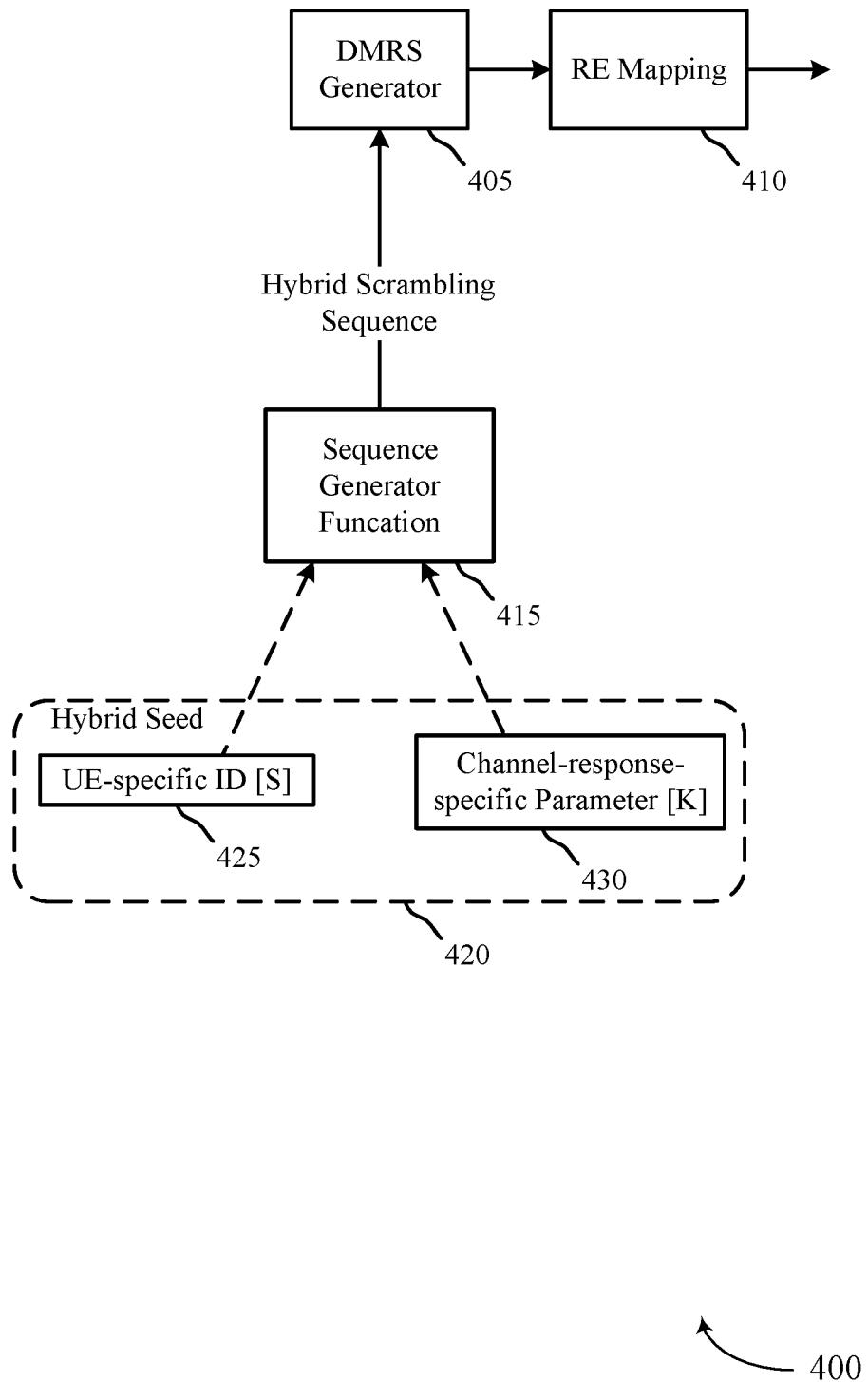
FIG. 4 illustrates an example of hybrid seed based scrambling that supports channel scrambling techniques in wireless communications in accordance with one or more aspects of the present disclosure.

FIG. 4 illustrates an example of a hybrid seed based scrambling 400 for DMRS that supports channel scrambling techniques in wireless communications in accordance with one or more aspects of the present disclosure. In some examples, hybrid seed based scrambling 400 may implement aspects of wireless communication system 100 and wireless communications system 200. For example, hybrid seed based scrambling 400 may be implemented by a UE 115 and a network entity 105 as described with reference to FIGS. 1 and 2.

In this example, a transmitter (e.g., a network entity or UE), and a receiver (e.g., a UE or network entity), may perform signal processing based on the described scrambling sequence. For example, when transmitting a DMRS (or other physical layer reference signal), DMRS generator 405 may generate a reference signal sequence in accordance with DMRS sequence generation techniques. Resource element (RE) mapping 410 may map the generated DMRS sequence to REs for transmission (e.g., via transmit circuitry). The DMRS sequence may be generated based on a scrambling sequence provided to the DMRS generator 405 by sequence generator function 415. In various aspects as discussed herein, the sequence generator function 415 may receive hybrid seed inputs 420, such as channel response-specific parameter 430 (K) and a UE-specific ID 425 (S). As discussed herein, the UE-specific ID 425 (S) may be, for example, a PCID (e.g., having 1008 possibilities), or a pdcch-DMRS-ScramblingID (e.g., a 16 bit ID for $2^{16}$=65,536 possibilities). The channel response-specific parameter 430 (K) may be an n-bit parameter (i.e., having $2^n$ possibilities). Such techniques may provide a hybrid scrambling sequence that is, for example, at least 31 bits long, which may provide a robust sequence that is less susceptible to brute force attacks than a scrambling sequence based on a UE-specific parameter alone.

Figure 5:
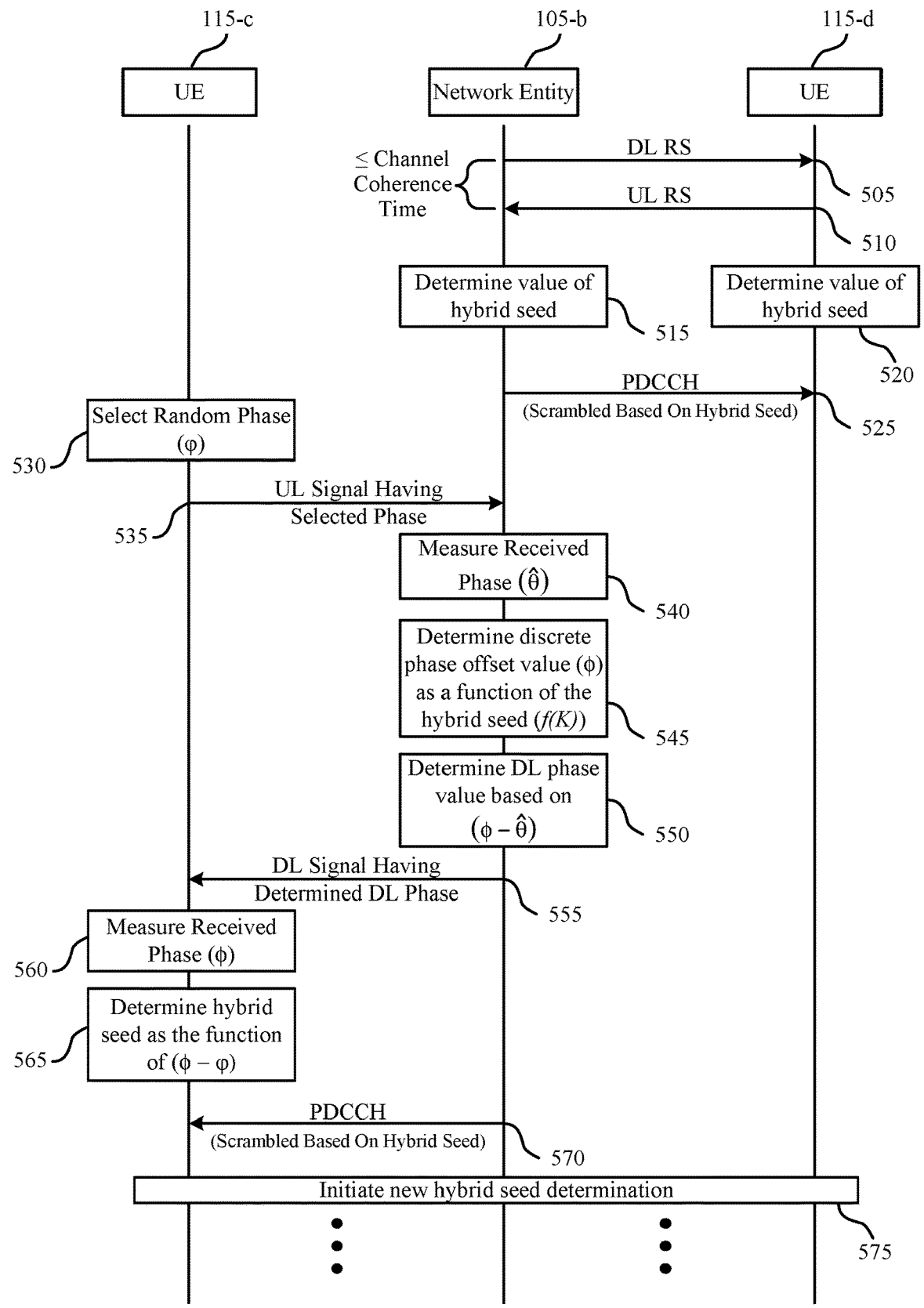
FIG. 5 illustrates an example of a process flow that supports channel scrambling techniques in wireless communications in accordance with one or more aspects of the present disclosure.

FIG. 5 illustrates an example of a process flow 500 that supports channel scrambling techniques in wireless communications in accordance with one or more aspects of the present disclosure. In some examples, process flow 500 may implement aspects of wireless communications system 100, or wireless communications system 200. The process flow 500 may illustrate an example of a network entity 105-*b*, a first UE 115-*c*, and a second UE 115-*d*, that may perform hybrid seed-based scrambling of physical layer communications in accordance with techniques discussed herein. Alternative examples of the following may be implemented, where some processes are performed in a different order than described or are not performed. In some cases, processes may include additional features not mentioned below, or further processes may be added.

At 505, the network entity 105-*b* may transmit a downlink reference signal to the first UE 115-*c*. In some case, the downlink reference signal may be a DMRS that is transmitted with a DCI, where the DCI includes a bit or flag that is set to indicate that a channel-specific parameter is to be established for hybrid seed-based scrambling. At 510, the first UE 115-*c* may transmit an uplink reference signal to the network entity 105-*b*. In some cases, the uplink reference signal may be a SRS, and may be transmitted within a channel coherence time of the downlink reference signal. Transmission of both the downlink and uplink reference signals within the channel coherence time may help ensure that channel reciprocity holds and each entity may separately determine the hybrid seed without additional signaling.

At 515, the network entity 105-*b* may determine the value of the hybrid seed. Likewise, at 520, the first UE 115-*c* may determine the value of the hybrid seed. As discussed herein, the hybrid seed may be determined based on a UE-specific ID and a measured channel parameter based on the measured reference signal transmissions (e.g., as a function of S and K). At 525, the network entity 105-*b* may transmit a PDCCH to the first UE 115-*c*, where a payload of the PDCCH and an associated DMRS are scrambled based on the determined hybrid seed. The first UE 115-*c* may receive the PDCCH and decode the PDCCH payload using the determined hybrid seed and DMRS.

At 530, the second UE 115-*d* may determine that the hybrid seed is needed for physical layer communications, and may select a random phase to initiate a seed sharing procedure. At 535, the second UE 115-*d* may transmit an uplink signal based on the selected random phase to the network entity 105-*b*. At 540, the network entity 105-*b* may measure the received phase of the uplink signal from the second UE 115-*d*.

At 545, the network entity 105-*b* may determine a discrete phase offset value as a function of the measured channel parameter (e.g., $f(K)$). At 550, the network entity 105-*b* may determine a downlink phase value based on the measured phase and the determined discrete phase offset value. At 555, the network entity 105-*b* may transmit a downlink signal to the second UE 115-*d* at the determined downlink phase value.

At 560, the second UE 115-*d* may receive the downlink signal and measure the received phase. At 565, the second UE 115-*d* may determine the hybrid seed based on a difference between the selected random phase and the measured received phase. Channel reciprocity may provide that the phase changes through the uplink and downlink channels are sufficiently similar that the second UE 115-*d* can reliably measure the phase difference to obtain the channel parameter and determine the hybrid seed. At 570, the network entity 105-*b* may transmit a PDCCH to the second UE 115-*d* having a payload and DMRS that are scrambled in accordance with the hybrid seed.

At 575, each of the devices may determine to initiate a new hybrid seed determination and the processes of this example may be repeated to determine and share an updated hybrid seed. In some cases, a hybrid seed lifetime may be set based on a timer. Such a timer may be set to a predetermined value, or may be configured by the network entity 105-*b*. In some cases, a value for the timer may be provided with PDCCH payload information that triggers a seed determination or is provided after measurements to determine the hybrid seed. In some cases, the value for the timer may be adjusted based on one or more factors, such as channel conditions, an amount of traffic, a number of UEs present that use the shared seed, or any combinations thereof.

Figure 6:
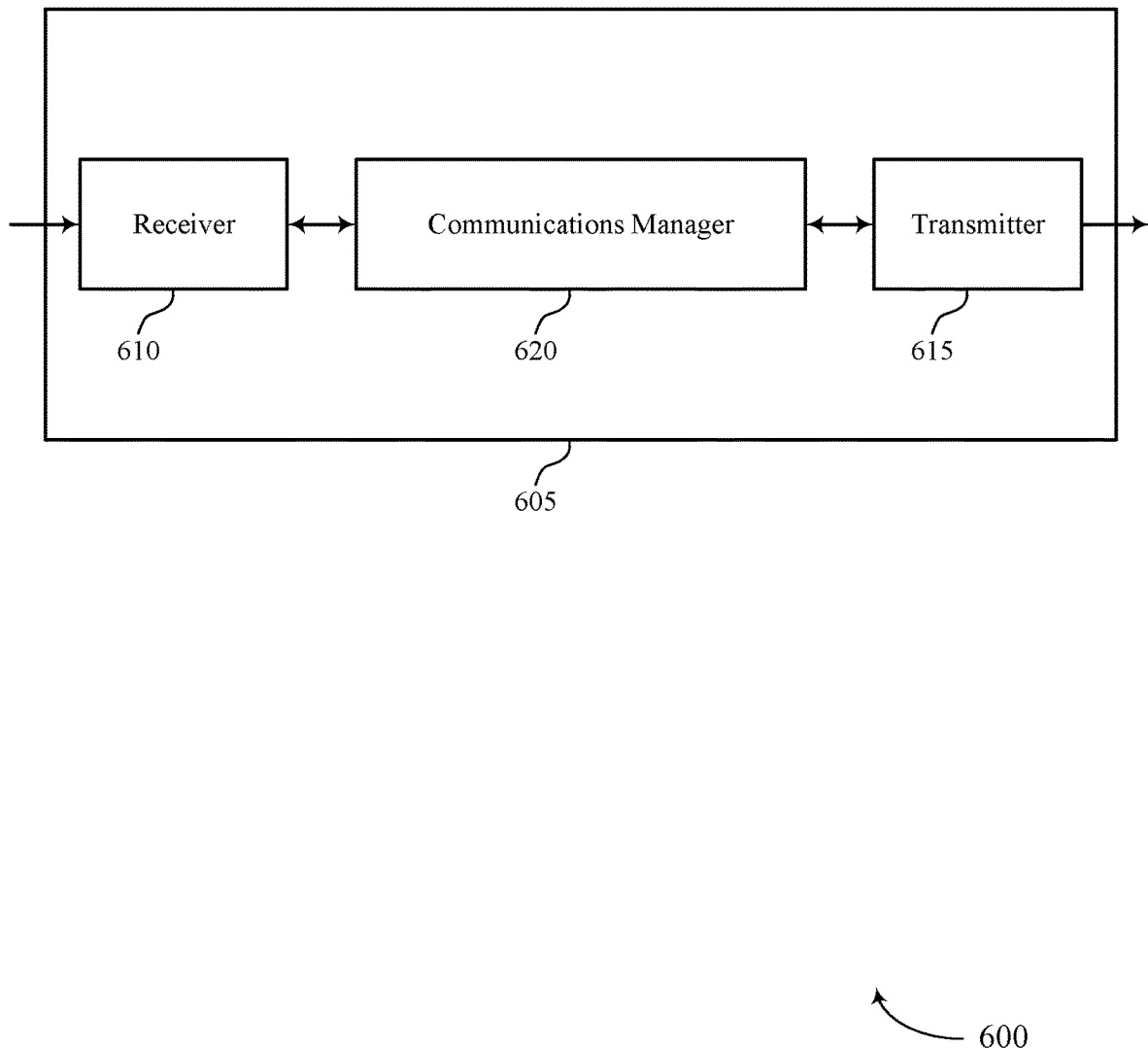
FIGS. 6 and 7 show block diagrams of devices that support channel scrambling techniques in wireless communications in accordance with one or more aspects of the present disclosure.

FIG. 6 shows a block diagram 600 of a device 605 that supports channel scrambling techniques in wireless communications in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to channel scrambling techniques in wireless communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to channel scrambling techniques in wireless communications). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of channel scrambling techniques in wireless communications as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for measuring a physical layer channel characteristic of a wireless channel used for communications between the UE and a network entity. The communications manager 620 may be configured as or otherwise support a means for determining a hybrid seed for the communications between the UE and a network entity, where the hybrid seed is a function of the measured physical layer channel characteristic of the wireless channel between the UE and the network entity. The communications manager 620 may be configured as or otherwise support a means for generating a scrambling sequence for the communications based on the hybrid seed. The communications manager 620 may be configured as or otherwise support a means for receiving at least a first communication based on the scrambling sequence.

Additionally, or alternatively, the communications manager 620 may support wireless communication at a UE in accordance with examples as disclosed herein. For example, the communications manager 620 may be configured as or otherwise support a means for transmitting a first communication to a network entity via a physical layer channel using a first phase offset value. The communications manager 620 may be configured as or otherwise support a means for receiving a second communication responsive to the first communication, the second communication transmitted using a second phase offset value that is based on a discrete phase offset value and an estimation of the first phase offset value, where the discrete phase offset value is a function of a hybrid seed used for scrambling communications on the physical layer channel. The communications manager 620 may be configured as or otherwise support a means for determining the discrete phase offset value based at least in part on a measured phase of the second communication and the first phase offset value. The communications manager 620 may be configured as or otherwise support a means for generating a scrambling sequence for the communications on the physical channel based on the hybrid seed, where the hybrid seed is determined based on the discrete phase offset value and the function. The communications manager 620 may be configured as or otherwise support a means for receiving at least a third communication based on the scrambling sequence.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for hybrid seed determination and sharing that provides physical layer security through additional randomness to the scrambling operation based on the uniqueness of the underlying physical layer channel. Such techniques may provide for more secure communications that are less vulnerable to attacks, and thereby enhances system reliability and utilization.

Figure 7:
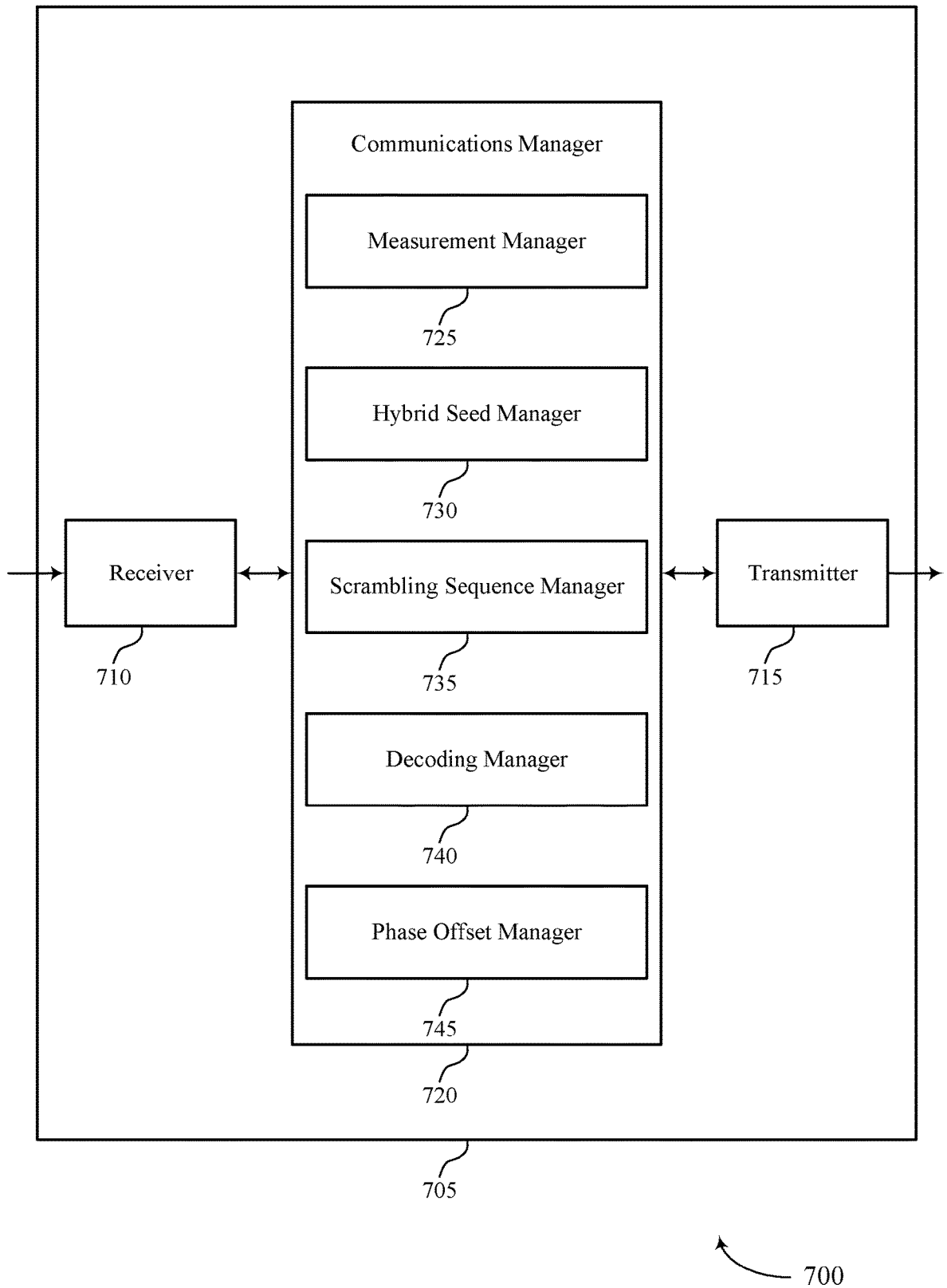

FIG. 7 shows a block diagram 700 of a device 705 that supports channel scrambling techniques in wireless communications in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to channel scrambling techniques in wireless communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to channel scrambling techniques in wireless communications). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of channel scrambling techniques in wireless communications as described herein. For example, the communications manager 720 may include a measurement manager 725, a hybrid seed manager 730, a scrambling sequence manager 735, a decoding manager 740, a phase offset manager 745, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The measurement manager 725 may be configured as or otherwise support a means for measuring a physical layer channel characteristic of a wireless channel used for communications between the UE and a network entity. The hybrid seed manager 730 may be configured as or otherwise support a means for determining a hybrid seed for the communications between the UE and a network entity, where the hybrid seed is a function of the measured physical layer channel characteristic of the wireless channel between the UE and the network entity. The scrambling sequence manager 735 may be configured as or otherwise support a means for generating a scrambling sequence for the communications based on the hybrid seed. The decoding manager 740 may be configured as or otherwise support a means for receiving at least a first communication based on the scrambling sequence.

Additionally, or alternatively, the communications manager 720 may support wireless communication at a UE in accordance with examples as disclosed herein. The phase offset manager 745 may be configured as or otherwise support a means for transmitting a first communication to a network entity via a physical layer channel using a first phase offset value. The phase offset manager 745 may be configured as or otherwise support a means for receiving a second communication responsive to the first communication, the second communication transmitted using a second phase offset value that is based on a discrete phase offset value and an estimation of the first phase offset value, where the discrete phase offset value is a function of a hybrid seed used for scrambling communications on the physical layer channel. The measurement manager 725 may be configured as or otherwise support a means for determining the discrete phase offset value based at least in part on a measured phase of the second communication and the first phase offset value. The scrambling sequence manager 735 may be configured as or otherwise support a means for generating a scrambling sequence for the communications on the physical channel based on the hybrid seed, where the hybrid seed is determined based on the discrete phase offset value and the function. The decoding manager 740 may be configured as or otherwise support a means for receiving at least a third communication based on the scrambling sequence.

Figure 8:
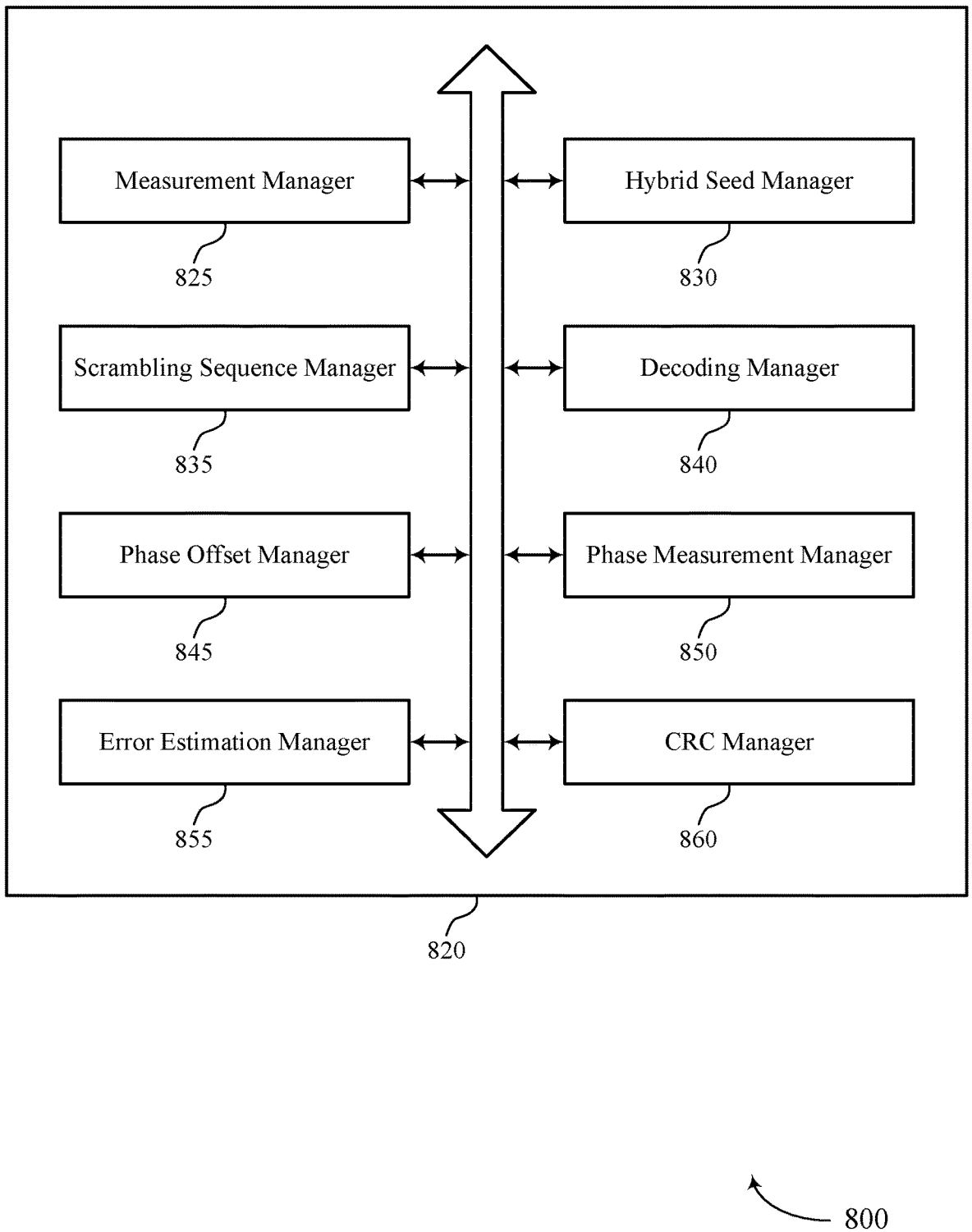
FIG. 8 shows a block diagram of a communications manager that supports channel scrambling techniques in wireless communications in accordance with one or more aspects of the present disclosure.

FIG. 8 shows a block diagram 800 of a communications manager 820 that supports channel scrambling techniques in wireless communications in accordance with one or more aspects of the present disclosure. The communications manager 820 may be an example of aspects of a communications manager 620, a communications manager 720, or both, as described herein. The communications manager 820, or various components thereof, may be an example of means for performing various aspects of channel scrambling techniques in wireless communications as described herein. For example, the communications manager 820 may include a measurement manager 825, a hybrid seed manager 830, a scrambling sequence manager 835, a decoding manager 840, a phase offset manager 845, a phase measurement manager 850, an error estimation manager 855, an CRC manager 860, or any combination thereof. Each of these components may communicate, directly or indirectly, with one another (e.g., via one or more buses).

The communications manager 820 may support wireless communication at a UE in accordance with examples as disclosed herein. The measurement manager 825 may be configured as or otherwise support a means for measuring a physical layer channel characteristic of a wireless channel used for communications between the UE and a network entity. The hybrid seed manager 830 may be configured as or otherwise support a means for determining a hybrid seed for the communications between the UE and a network entity, where the hybrid seed is a function of the measured physical layer channel characteristic of the wireless channel between the UE and the network entity. The scrambling sequence manager 835 may be configured as or otherwise support a means for generating a scrambling sequence for the communications based on the hybrid seed. The decoding manager 840 may be configured as or otherwise support a means for receiving at least a first communication based on the scrambling sequence.

In some examples, to support receiving at least the first communication, the decoding manager 840 may be configured as or otherwise support a means for decoding one or more of a control channel payload or a DMRS based on the scrambling sequence that is generated from the hybrid seed.

In some examples, to support generating the scrambling sequence, the scrambling sequence manager 835 may be configured as or otherwise support a means for identifying one or more upper layer initialization parameters (S) associated with the scrambling sequence. In some examples, to support generating the scrambling sequence, the scrambling sequence manager 835 may be configured as or otherwise support a means for generating the scrambling sequence based on a function of the upper layer initialization parameters and the hybrid seed. In some examples, the one or more upper layer initialization parameters include a scrambling ID of the UE, a physical cell identification (PCID), or any combinations thereof, and where the measured physical layer channel characteristic is measured separately at the UE and at the network entity and channel reciprocity of the wireless channel provides that both the UE and the network entity obtain a same hybrid seed.

In some examples, the scrambling sequence manager 835 may be configured as or otherwise support a means for determining, responsive to an indication from the network entity or a timer expiration, a new scrambling sequence based on an updated physical layer channel characteristic measurement and associated determined hybrid seed. In some examples, the measuring the physical layer channel characteristic of the wireless channel uses a downlink reference signal associated with hybrid seed determination, and where the UE transmits an uplink reference signal to the network entity within a channel coherence time for determination of the hybrid seed at the network entity. In some examples, the measured physical layer channel characteristic is one or more of a phase measurement, a received signal strength, an angle-of-arrival (AoA), an angle of departure (AoD), a measured channel matrix, or any combinations thereof.

Additionally, or alternatively, the communications manager 820 may support wireless communication at a UE in accordance with examples as disclosed herein. The phase offset manager 845 may be configured as or otherwise support a means for transmitting a first communication to a network entity via a physical layer channel using a first phase offset value. In some examples, the phase offset manager 845 may be configured as or otherwise support a means for receiving a second communication responsive to the first communication, the second communication transmitted using a second phase offset value that is based on a discrete phase offset value and an estimation of the first phase offset value, where the discrete phase offset value is a function of a hybrid seed used for scrambling communications on the physical layer channel. In some examples, the measurement manager 825 may be configured as or otherwise support a means for determining the discrete phase offset value based at least in part on a measured phase of the second communication and the first phase offset value. In some examples, the scrambling sequence manager 835 may be configured as or otherwise support a means for generating a scrambling sequence for the communications on the physical channel based on the hybrid seed, where the hybrid seed is determined based on the discrete phase offset value and the function. In some examples, the decoding manager 840 may be configured as or otherwise support a means for receiving at least a third communication based on the scrambling sequence.

In some examples, the first phase offset value is selected randomly from range of available phase offset values, a beam used to transmit the first communication is selected randomly from a set of available beams, or any combinations thereof, for each instance of a transmission of the first communication to the network entity.

In some examples, to support determining the discrete phase offset value, the phase measurement manager 850 may be configured as or otherwise support a means for measuring a received phase of the second communication. In some examples, to support determining the discrete phase offset value, the phase measurement manager 850 may be configured as or otherwise support a means for determining a difference between the received phase and the first phase offset value. In some examples, to support determining the discrete phase offset value, the phase measurement manager 850 may be configured as or otherwise support a means for determining the discrete phase offset value based on the difference between the received phase and the first phase offset value. In some examples, the second communication is transmitted via a set of multiple frequency domain tones, and provides a discrete phase offset that is quantized by a set of multiple bits.

In some examples, the error estimation manager 855 may be configured as or otherwise support a means for estimating an error of channel phase measurements for the physical layer channel. In some examples, the hybrid seed manager 830 may be configured as or otherwise support a means for suspending communications based on the hybrid seed when the error of channel phase measurements exceeds a threshold value. In some examples, the CRC manager 860 may be configured as or otherwise support a means for performing an CRC on a payload of the second communication based on the scrambling sequence. In some examples, the CRC manager 860 may be configured as or otherwise support a means for transmitting a negative acknowledgment to the network entity responsive to a failure of the CRC.

Figure 9:
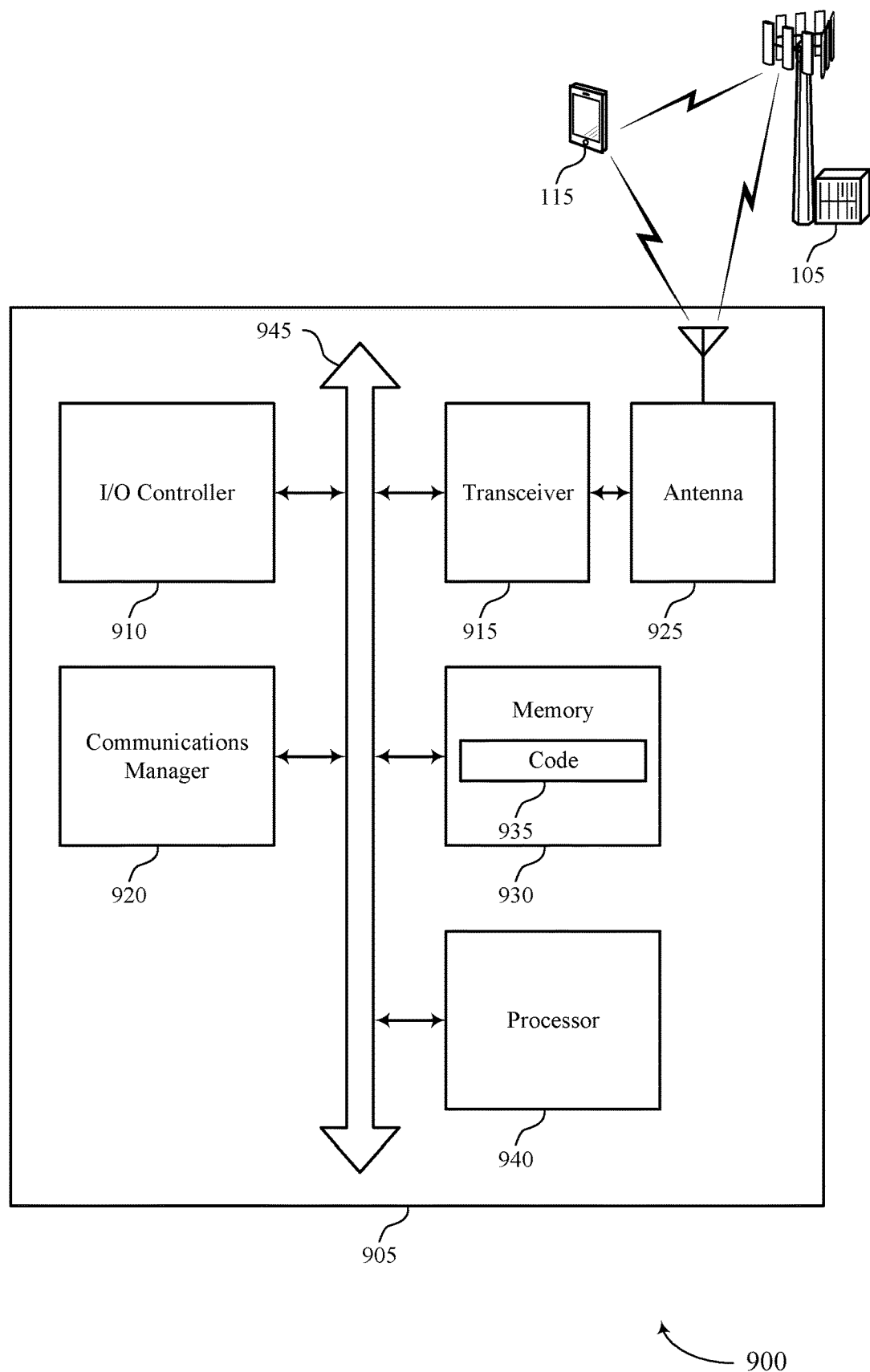
FIG. 9 shows a diagram of a system including a device that supports channel scrambling techniques in wireless communications in accordance with one or more aspects of the present disclosure.

FIG. 9 shows a diagram of a system 900 including a device 905 that supports channel scrambling techniques in wireless communications in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting channel scrambling techniques in wireless communications). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for measuring a physical layer channel characteristic of a wireless channel used for communications between the UE and a network entity. The communications manager 920 may be configured as or otherwise support a means for determining a hybrid seed for the communications between the UE and a network entity, where the hybrid seed is a function of the measured physical layer channel characteristic of the wireless channel between the UE and the network entity. The communications manager 920 may be configured as or otherwise support a means for generating a scrambling sequence for the communications based on the hybrid seed. The communications manager 920 may be configured as or otherwise support a means for receiving at least a first communication based on the scrambling sequence.

Additionally, or alternatively, the communications manager 920 may support wireless communication at a UE in accordance with examples as disclosed herein. For example, the communications manager 920 may be configured as or otherwise support a means for transmitting a first communication to a network entity via a physical layer channel using a first phase offset value. The communications manager 920 may be configured as or otherwise support a means for receiving a second communication responsive to the first communication, the second communication transmitted using a second phase offset value that is based on a discrete phase offset value and an estimation of the first phase offset value, where the discrete phase offset value is a function of a hybrid seed used for scrambling communications on the physical layer channel. The communications manager 920 may be configured as or otherwise support a means for determining the discrete phase offset value based at least in part on a measured phase of the second communication and the first phase offset value. The communications manager 920 may be configured as or otherwise support a means for generating a scrambling sequence for the communications on the physical channel based on the hybrid seed, where the hybrid seed is determined based on the discrete phase offset value and the function. The communications manager 920 may be configured as or otherwise support a means for receiving at least a third communication based on the scrambling sequence.

By including or configuring the communications manager 920 in accordance with examples as described herein, the device 905 may support techniques for hybrid seed determination and sharing that provides physical layer security through additional randomness to the scrambling operation based on the uniqueness of the underlying physical layer channel. Such techniques may provide for more secure communications that are less vulnerable to attacks, and thereby enhance system reliability and utilization.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of channel scrambling techniques in wireless communications as described herein, or the processor 940 and the memory 930 may be otherwise configured to perform or support such operations.

Figure 10:
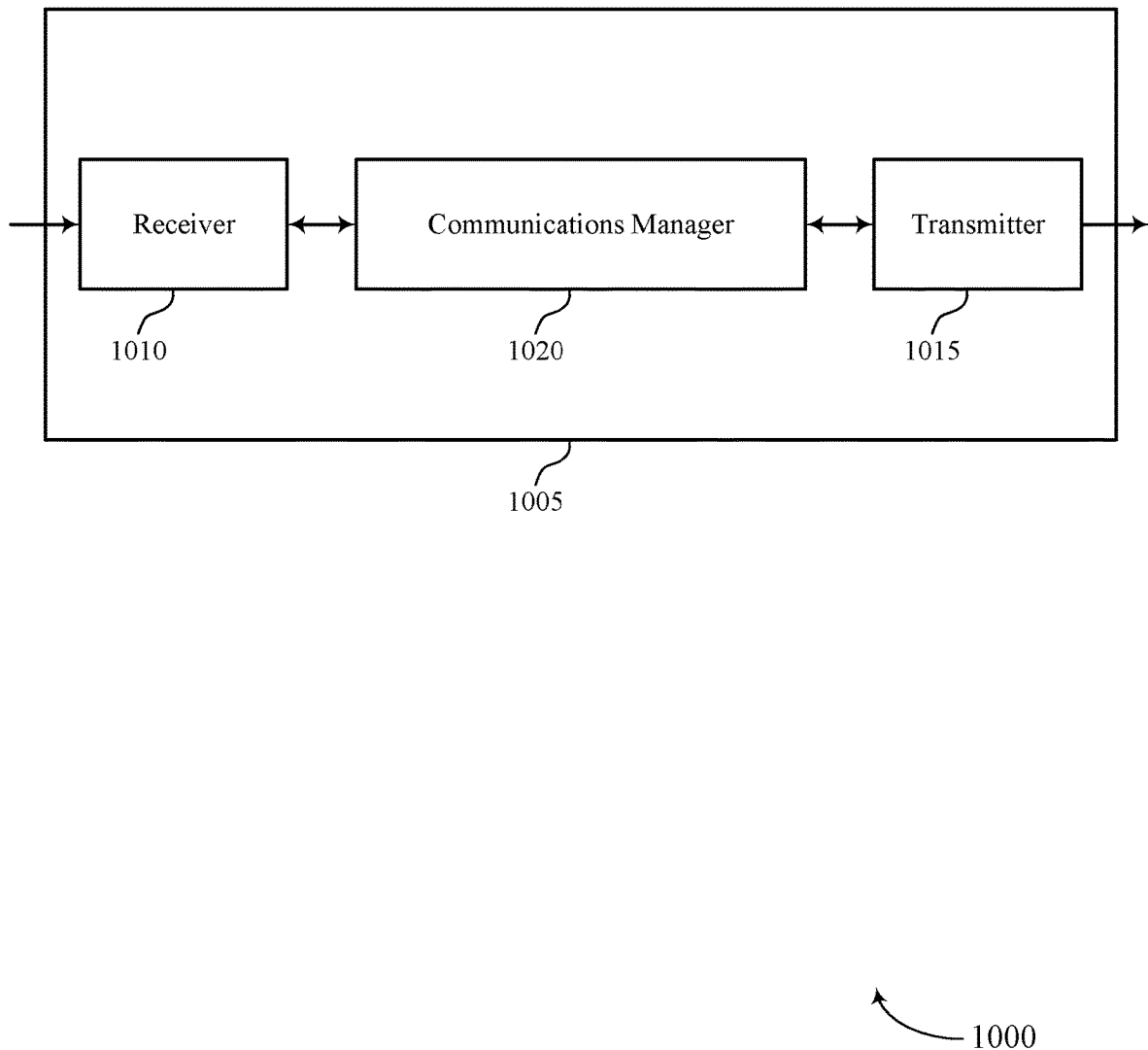
FIGS. 10 and 11 show block diagrams of devices that support channel scrambling techniques in wireless communications in accordance with one or more aspects of the present disclosure.

FIG. 10 shows a block diagram 1000 of a device 1005 that supports channel scrambling techniques in wireless communications in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of channel scrambling techniques in wireless communications as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 may be configured as or otherwise support a means for measuring a physical layer channel characteristic of a wireless channel used for communications with a first UE. The communications manager 1020 may be configured as or otherwise support a means for determining a hybrid seed for the communications with the first UE, where the hybrid seed is a function of the measured physical layer channel characteristic of the wireless channel between the first UE and the network entity. The communications manager 1020 may be configured as or otherwise support a means for generating a scrambling sequence for the communications based on the hybrid seed. The communications manager 1020 may be configured as or otherwise support a means for transmitting at least a first communication that is scrambled by the scrambling sequence.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for hybrid seed determination and sharing that provides physical layer security through additional randomness to the scrambling operation based on the uniqueness of the underlying physical layer channel. Such techniques may provide for more secure communications that are less vulnerable to attacks, and thereby enhance system reliability and utilization.

Figure 11:
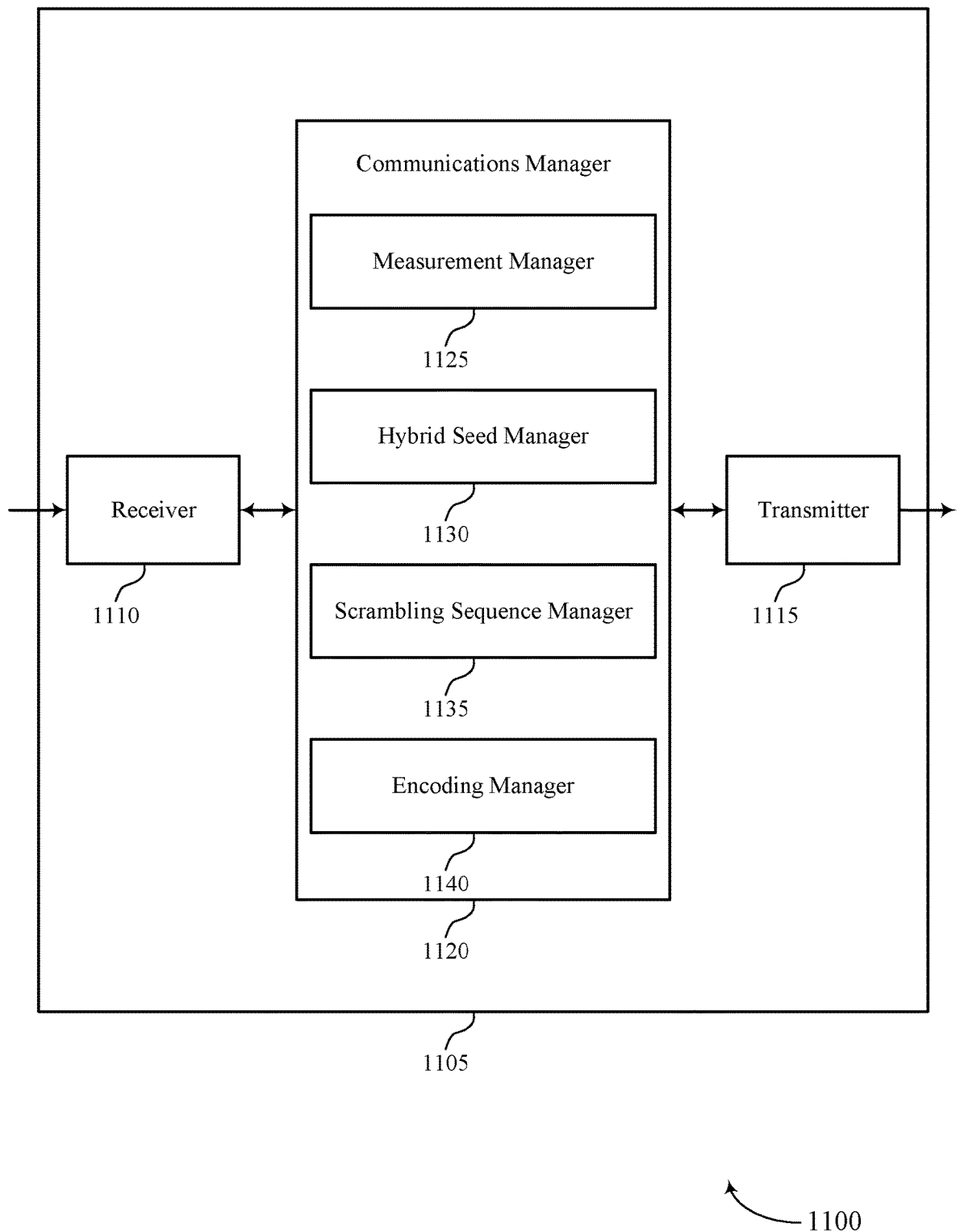

FIG. 11 shows a block diagram 1100 of a device 1105 that supports channel scrambling techniques in wireless communications in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of channel scrambling techniques in wireless communications as described herein. For example, the communications manager 1120 may include a measurement manager 1125, a hybrid seed manager 1130, a scrambling sequence manager 1135, an encoding manager 1140, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The measurement manager 1125 may be configured as or otherwise support a means for measuring a physical layer channel characteristic of a wireless channel used for communications with a first UE. The hybrid seed manager 1130 may be configured as or otherwise support a means for determining a hybrid seed for the communications with the first UE, where the hybrid seed is a function of the measured physical layer channel characteristic of the wireless channel between the first UE and the network entity. The scrambling sequence manager 1135 may be configured as or otherwise support a means for generating a scrambling sequence for the communications based on the hybrid seed. The encoding manager 1140 may be configured as or otherwise support a means for transmitting at least a first communication that is scrambled by the scrambling sequence.

Figure 12:
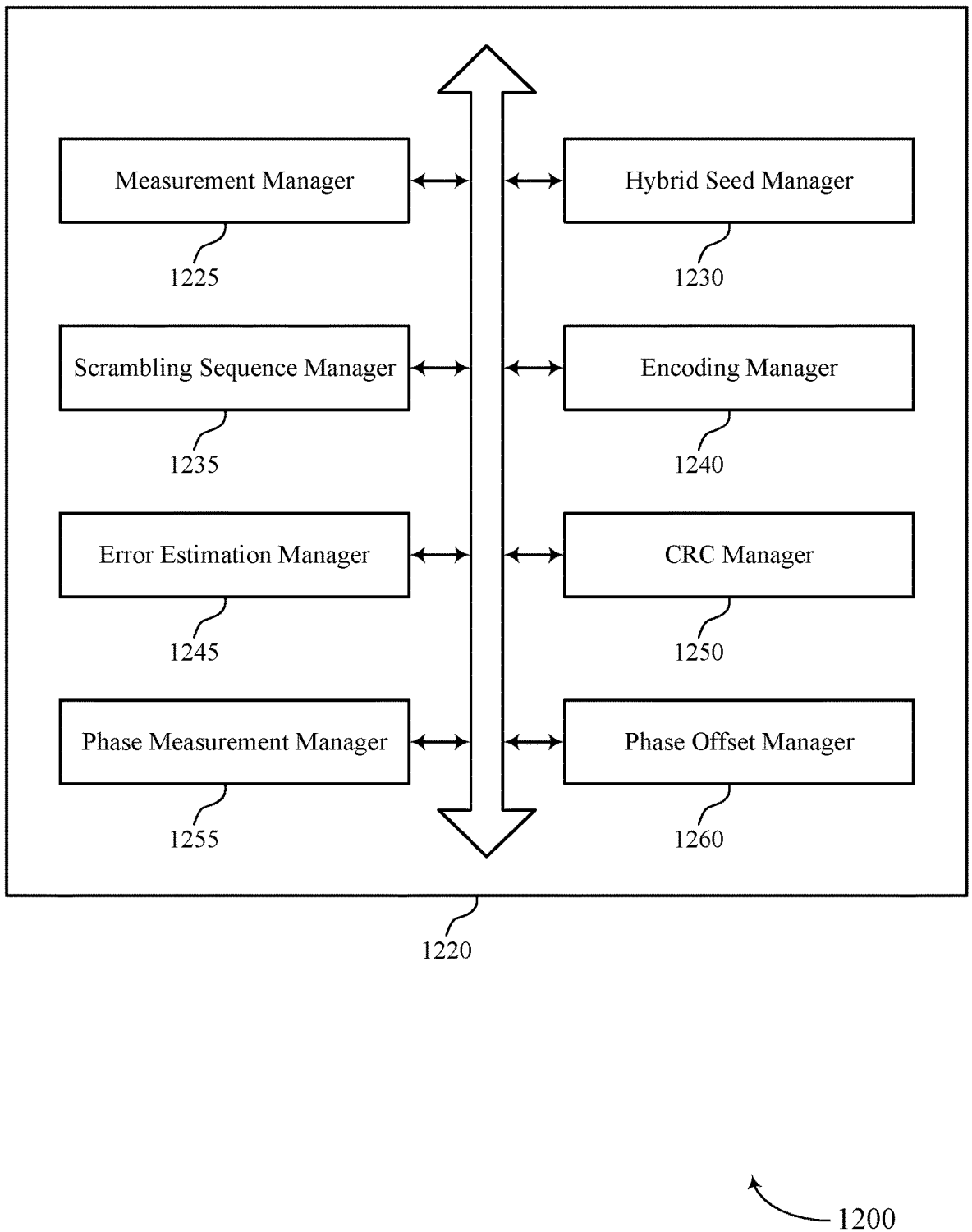
FIG. 12 shows a block diagram of a communications manager that supports channel scrambling techniques in wireless communications in accordance with one or more aspects of the present disclosure.

FIG. 12 shows a block diagram 1200 of a communications manager 1220 that supports channel scrambling techniques in wireless communications in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of channel scrambling techniques in wireless communications as described herein. For example, the communications manager 1220 may include a measurement manager 1225, a hybrid seed manager 1230, a scrambling sequence manager 1235, an encoding manager 1240, an error estimation manager 1245, an CRC manager 1250, a phase measurement manager 1255, a phase offset manager 1260, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The measurement manager 1225 may be configured as or otherwise support a means for measuring a physical layer channel characteristic of a wireless channel used for communications with a first UE. The hybrid seed manager 1230 may be configured as or otherwise support a means for determining a hybrid seed for the communications with the first UE, where the hybrid seed is a function of the measured physical layer channel characteristic of the wireless channel between the first UE and the network entity. The scrambling sequence manager 1235 may be configured as or otherwise support a means for generating a scrambling sequence for the communications based on the hybrid seed. The encoding manager 1240 may be configured as or otherwise support a means for transmitting at least a first communication that is scrambled by the scrambling sequence.

In some examples, the encoding manager 1240 may be configured as or otherwise support a means for encoding one or more of a control channel payload or a DMRS of the first communication based on the scrambling sequence that is generated from the hybrid seed.

In some examples, to support generating the scrambling sequence, the scrambling sequence manager 1235 may be configured as or otherwise support a means for identifying one or more upper layer initialization parameters of the first UE that are associated with the scrambling sequence. In some examples, to support generating the scrambling sequence, the scrambling sequence manager 1235 may be configured as or otherwise support a means for generating the scrambling sequence based on a function of the upper layer initialization parameters and the hybrid seed.

In some examples, the one or more upper layer initialization parameters include a scrambling ID of the first UE, a physical cell identification (PCID) associated with the network entity, or any combinations thereof, and where the measured physical layer channel characteristic is measured separately at the first UE and at the network entity and channel reciprocity of the wireless channel provides that both the first UE and the network entity obtain a same hybrid seed. In some examples, the measured physical layer channel characteristic is one or more of a phase measurement, a received signal strength, an angle-of-arrival (AoA), an angle of departure (AoD), a measured channel matrix, or any combinations thereof.

In some examples, the hybrid seed manager 1230 may be configured as or otherwise support a means for sharing the hybrid seed with at least a second UE. In some examples, to support sharing, the phase measurement manager 1255 may be configured as or otherwise support a means for measuring a first phase offset value of a second communication from the second UE. In some examples, to support sharing, the phase offset manager 1260 may be configured as or otherwise support a means for determining a discrete phase offset value as a function of the hybrid seed. In some examples, to support sharing, the phase offset manager 1260 may be configured as or otherwise support a means for transmitting, to the second UE, a third communication using a second phase offset value that is based on a discrete phase offset value and the measured first phase offset value. In some examples, the third communication is transmitted via a set of multiple frequency domain tones, and provides a discrete phase offset that is quantized by a set of multiple bits.

In some examples, the error estimation manager 1245 may be configured as or otherwise support a means for estimating an error of channel phase measurements for the wireless channel. In some examples, the hybrid seed manager 1230 may be configured as or otherwise support a means for suspending communications based on the hybrid seed when the error of channel phase measurements exceeds a threshold value. In some examples, the CRC manager 1250 may be configured as or otherwise support a means for determining an CRC value of a payload of the first communication based on the scrambling sequence. In some examples, the CRC manager 1250 may be configured as or otherwise support a means for appending the CRC value to the payload of the first communication. In some examples, the CRC manager 1250 may be configured as or otherwise support a means for retransmitting the first communication responsive to an associated negative acknowledgment received from the first UE.

Figure 13:
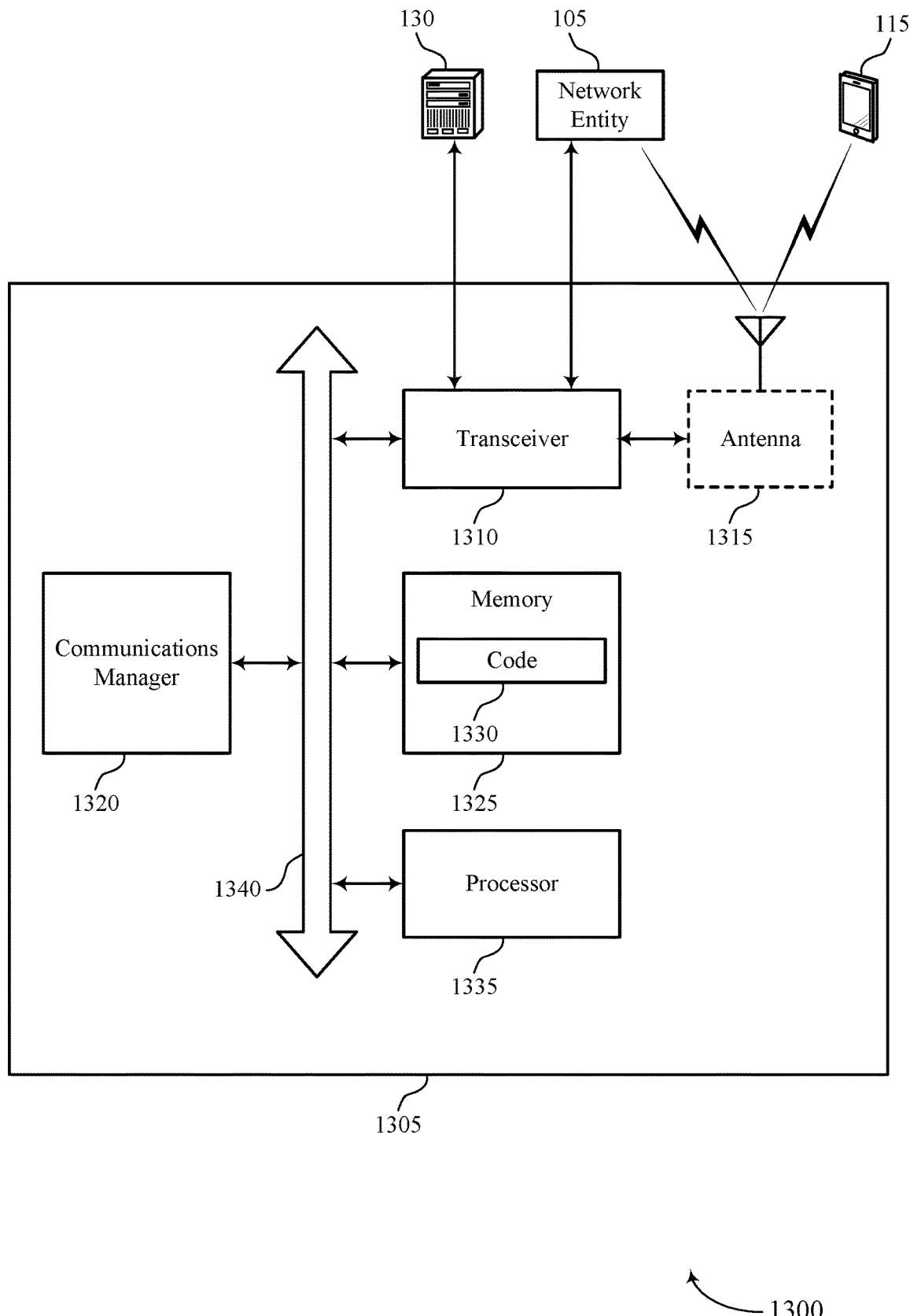
FIG. 13 shows a diagram of a system including a device that supports channel scrambling techniques in wireless communications in accordance with one or more aspects of the present disclosure.

FIG. 13 shows a diagram of a system 1300 including a device 1305 that supports channel scrambling techniques in wireless communications in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting channel scrambling techniques in wireless communications). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for measuring a physical layer channel characteristic of a wireless channel used for communications with a first UE. The communications manager 1320 may be configured as or otherwise support a means for determining a hybrid seed for the communications with the first UE, where the hybrid seed is a function of the measured physical layer channel characteristic of the wireless channel between the first UE and the network entity. The communications manager 1320 may be configured as or otherwise support a means for generating a scrambling sequence for the communications based on the hybrid seed. The communications manager 1320 may be configured as or otherwise support a means for transmitting at least a first communication that is scrambled by the scrambling sequence.

By including or configuring the communications manager 1320 in accordance with examples as described herein, the device 1305 may support techniques for hybrid seed determination and sharing that provides physical layer security through additional randomness to the scrambling operation based on the uniqueness of the underlying physical layer channel. Such techniques may provide for more secure communications that are less vulnerable to attacks, and thereby enhance system reliability and utilization.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of channel scrambling techniques in wireless communications as described herein, or the processor 1335 and the memory 1325 may be otherwise configured to perform or support such operations.

Figure 14:
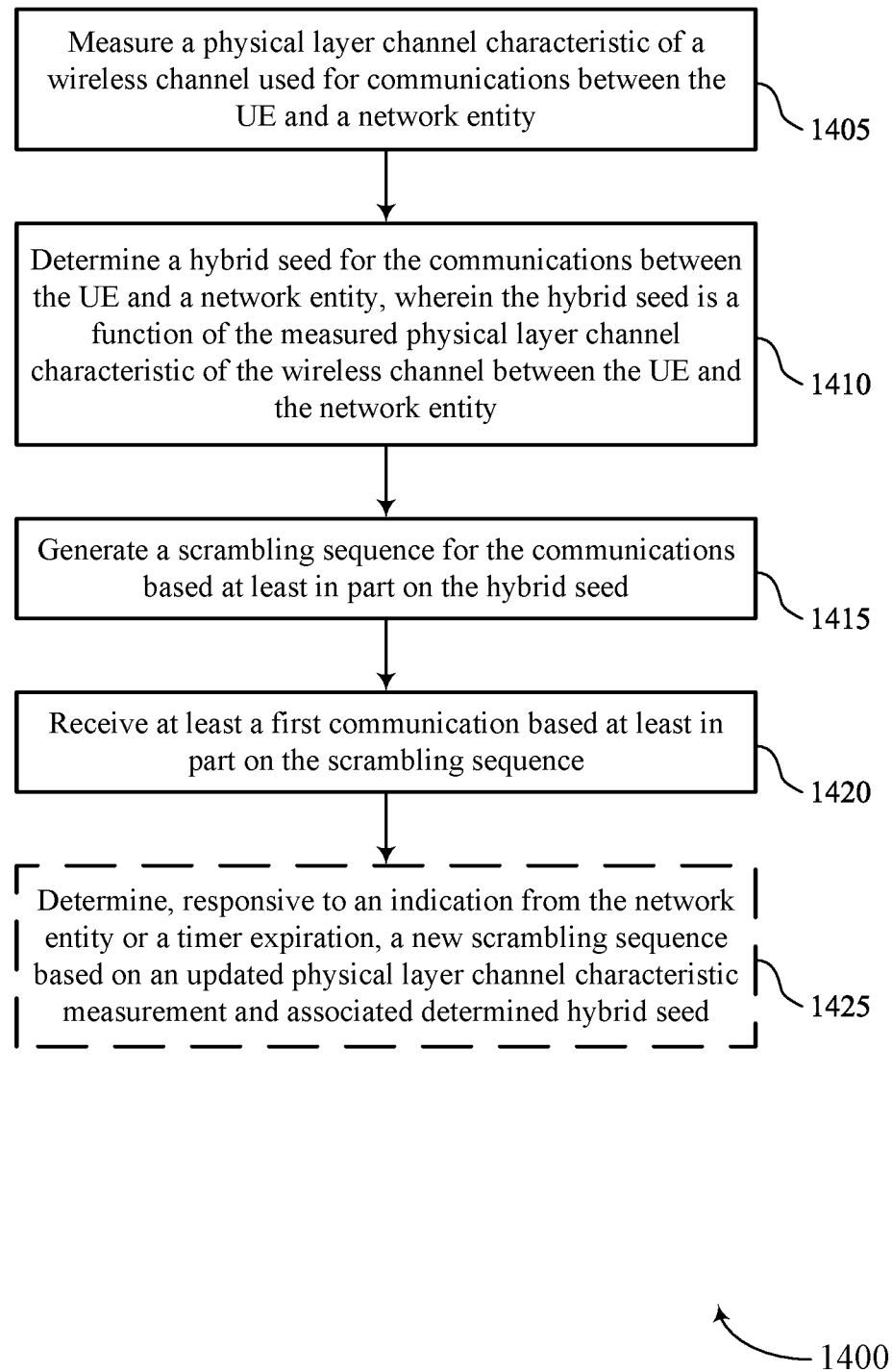
FIGS. 14 through 18 show flowcharts illustrating methods that support channel scrambling techniques in wireless communications in accordance with one or more aspects of the present disclosure.

FIG. 14 shows a flowchart illustrating a method 1400 that supports channel scrambling techniques in wireless communications in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include measuring a physical layer channel characteristic of a wireless channel used for communications between the UE and a network entity. The operations of 1405 may be performed in accordance with examples as disclosed herein. In some examples, aspects of the operations of 1405 may be performed by a measurement manager 825 as described with reference to FIG. 8.

At 1410, the method may include determining a hybrid seed for the communications between the UE and a network entity, where the hybrid seed is a function of the measured physical layer channel characteristic of the wireless channel between the UE and the network entity. The operations of 1410 may be performed in accordance with examples as disclosed herein. In some examples, aspects of the operations of 1410 may be performed by a hybrid seed manager 830 as described with reference to FIG. 8.

At 1415, the method may include generating a scrambling sequence for the communications based on the hybrid seed. The operations of 1415 may be performed in accordance with examples as disclosed herein. In some examples, aspects of the operations of 1415 may be performed by a scrambling sequence manager 835 as described with reference to FIG. 8.

At 1420, the method may include receiving at least a first communication based on the scrambling sequence. The operations of 1420 may be performed in accordance with examples as disclosed herein. In some examples, aspects of the operations of 1420 may be performed by a decoding manager 840 as described with reference to FIG. 8.

Optionally, at 1425, the method may include determining, responsive to an indication from the network entity or a timer expiration, a new scrambling sequence based on an updated physical layer channel characteristic measurement and associated determined hybrid seed. The operations of 1425 may be performed in accordance with examples as disclosed herein. In some examples, aspects of the operations of 1425 may be performed by a scrambling sequence manager 835 as described with reference to FIG. 8.

Figure 15:
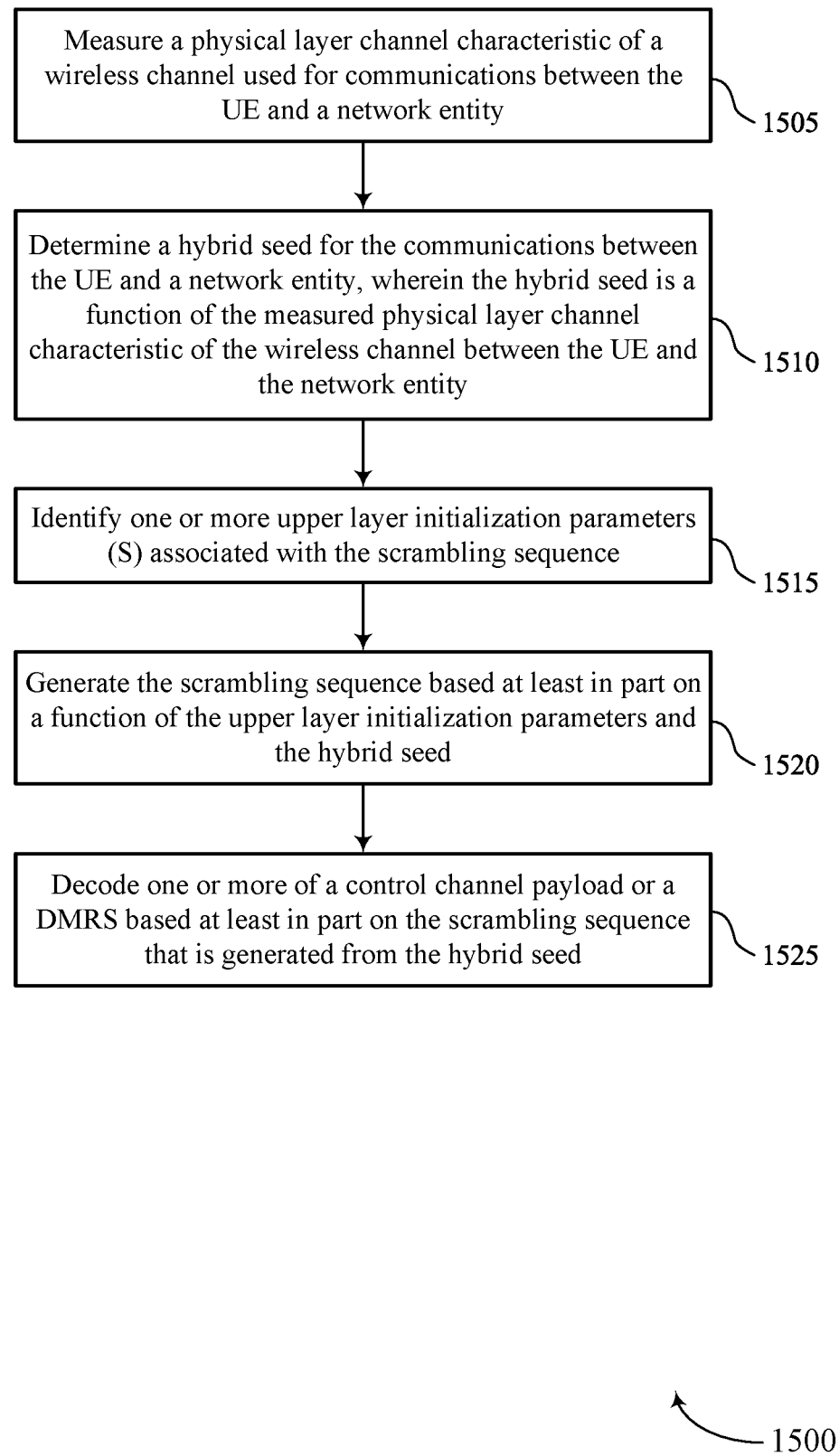

FIG. 15 shows a flowchart illustrating a method 1500 that supports channel scrambling techniques in wireless communications in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include measuring a physical layer channel characteristic of a wireless channel used for communications between the UE and a network entity. The operations of 1505 may be performed in accordance with examples as disclosed herein. In some examples, aspects of the operations of 1505 may be performed by a measurement manager 825 as described with reference to FIG. 8.

At 1510, the method may include determining a hybrid seed for the communications between the UE and a network entity, where the hybrid seed is a function of the measured physical layer channel characteristic of the wireless channel between the UE and the network entity. The operations of 1510 may be performed in accordance with examples as disclosed herein. In some examples, aspects of the operations of 1510 may be performed by a hybrid seed manager 830 as described with reference to FIG. 8.

At 1515, the method may include identifying one or more upper layer initialization parameters (S) associated with the scrambling sequence. The operations of 1515 may be performed in accordance with examples as disclosed herein. In some examples, aspects of the operations of 1515 may be performed by a scrambling sequence manager 835 as described with reference to FIG. 8.

At 1520, the method may include generating the scrambling sequence based on a function of the upper layer initialization parameters and the hybrid seed. The operations of 1520 may be performed in accordance with examples as disclosed herein. In some examples, aspects of the operations of 1520 may be performed by a scrambling sequence manager 835 as described with reference to FIG. 8.

At 1525, the method may include decoding one or more of a control channel payload or a DMRS based on the scrambling sequence that is generated from the hybrid seed. The operations of 1525 may be performed in accordance with examples as disclosed herein. In some examples, aspects of the operations of 1525 may be performed by a decoding manager 840 as described with reference to FIG. 8.

Figure 16:
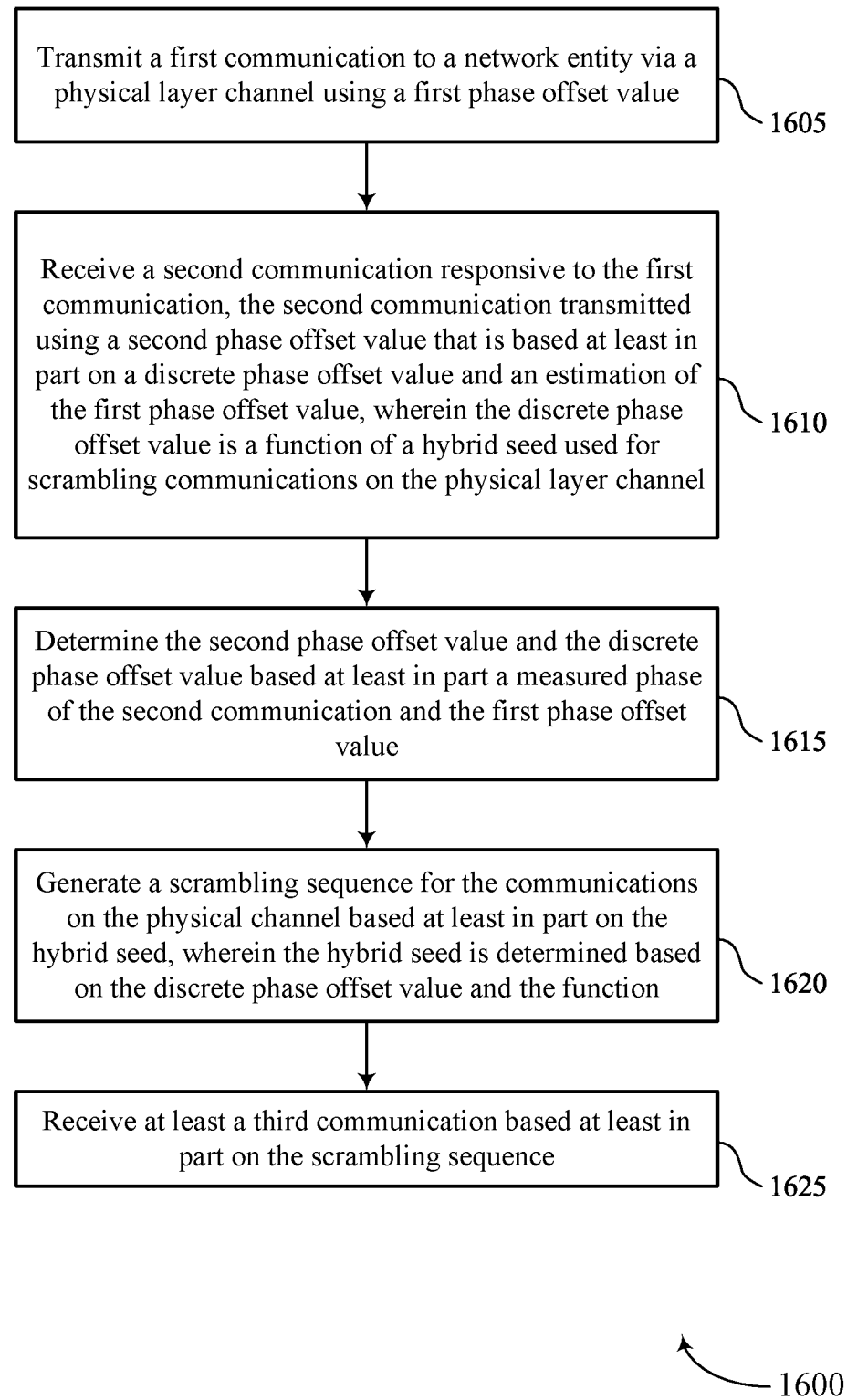

FIG. 16 shows a flowchart illustrating a method 1600 that supports channel scrambling techniques in wireless communications in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include transmitting a first communication to a network entity via a physical layer channel using a first phase offset value. The operations of 1605 may be performed in accordance with examples as disclosed herein. In some examples, aspects of the operations of 1605 may be performed by a phase offset manager 845 as described with reference to FIG. 8.

At 1610, the method may include receiving a second communication responsive to the first communication, the second communication transmitted using a second phase offset value that is based on a discrete phase offset value and an estimation of the first phase offset value, where the discrete phase offset value is a function of a hybrid seed used for scrambling communications on the physical layer channel. The operations of 1610 may be performed in accordance with examples as disclosed herein. In some examples, aspects of the operations of 1610 may be performed by a phase offset manager 845 as described with reference to FIG. 8.

At 1615, the method may include determining the discrete phase offset value based at least in part on a measured phase of the second communication and the first phase offset value. The operations of 1615 may be performed in accordance with examples as disclosed herein. In some examples, aspects of the operations of 1615 may be performed by a measurement manager 825 as described with reference to FIG. 8.

At 1620, the method may include generating a scrambling sequence for the communications on the physical channel based on the hybrid seed, where the hybrid seed is determined based on the discrete phase offset value and the function. The operations of 1620 may be performed in accordance with examples as disclosed herein. In some examples, aspects of the operations of 1620 may be performed by a scrambling sequence manager 835 as described with reference to FIG. 8.

At 1625, the method may include receiving at least a third communication based on the scrambling sequence. The operations of 1625 may be performed in accordance with examples as disclosed herein. In some examples, aspects of the operations of 1625 may be performed by a decoding manager 840 as described with reference to FIG. 8.

Figure 17:
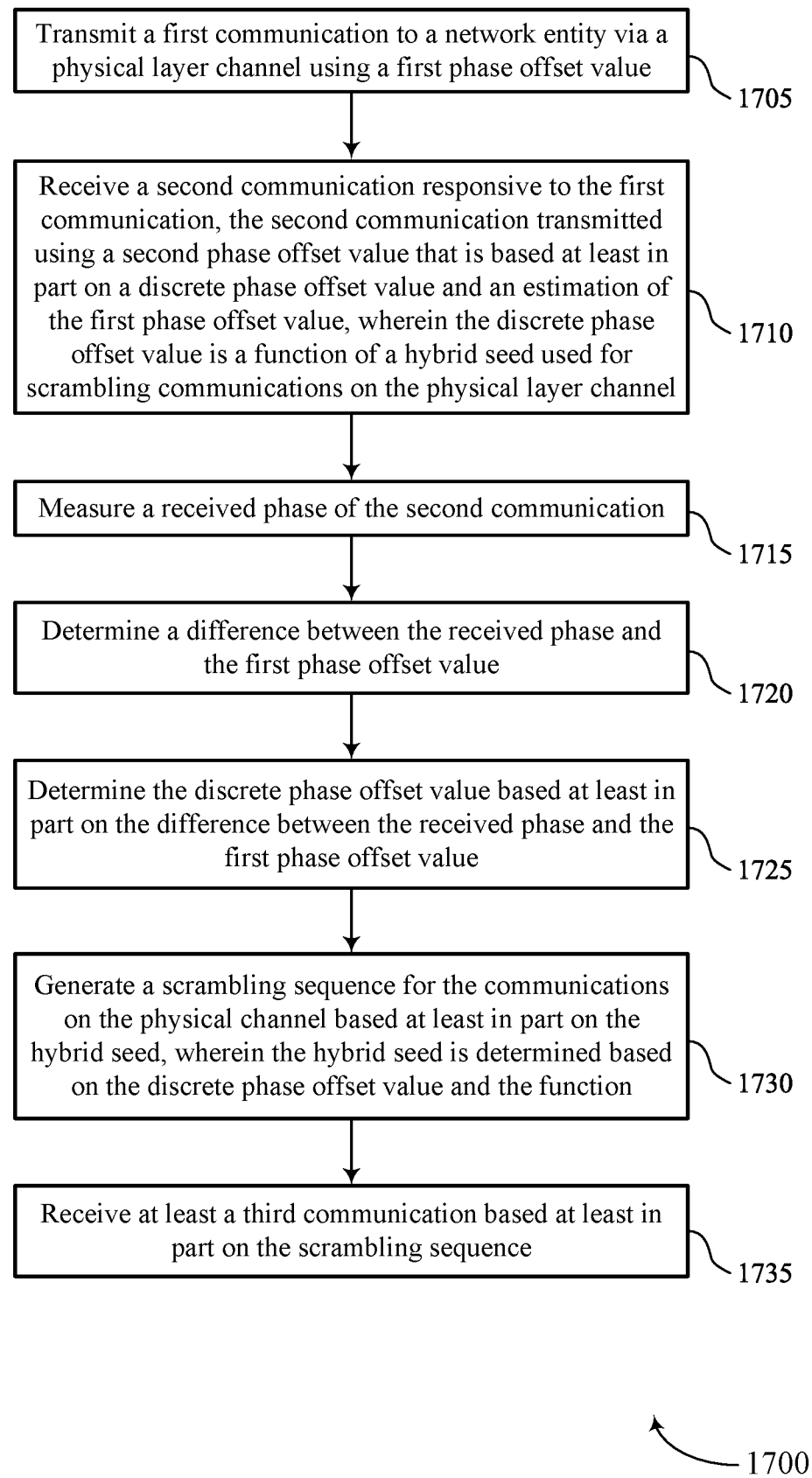

FIG. 17 shows a flowchart illustrating a method 1700 that supports channel scrambling techniques in wireless communications in accordance with one or more aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1705, the method may include transmitting a first communication to a network entity via a physical layer channel using a first phase offset value. The operations of 1705 may be performed in accordance with examples as disclosed herein. In some examples, aspects of the operations of 1705 may be performed by a phase offset manager 845 as described with reference to FIG. 8.

At 1710, the method may include receiving a second communication responsive to the first communication, the second communication transmitted using a second phase offset value that is based on a discrete phase offset value and an estimation of the first phase offset value, where the discrete phase offset value is a function of a hybrid seed used for scrambling communications on the physical layer channel. The operations of 1710 may be performed in accordance with examples as disclosed herein. In some examples, aspects of the operations of 1710 may be performed by a phase offset manager 845 as described with reference to FIG. 8.

At 1715, the method may include measuring a received phase of the second communication. The operations of 1715 may be performed in accordance with examples as disclosed herein. In some examples, aspects of the operations of 1715 may be performed by a phase measurement manager 850 as described with reference to FIG. 8.

At 1720, the method may include determining a difference between the received phase and the first phase offset value. The operations of 1720 may be performed in accordance with examples as disclosed herein. In some examples, aspects of the operations of 1720 may be performed by a phase measurement manager 850 as described with reference to FIG. 8.

At 1725, the method may include determining the discrete phase offset value based on the difference between the received phase and the first phase offset value. The operations of 1725 may be performed in accordance with examples as disclosed herein. In some examples, aspects of the operations of 1725 may be performed by a phase measurement manager 850 as described with reference to FIG. 8.

At 1730, the method may include generating a scrambling sequence for the communications on the physical channel based on the hybrid seed, where the hybrid seed is determined based on the discrete phase offset value and the function. The operations of 1730 may be performed in accordance with examples as disclosed herein. In some examples, aspects of the operations of 1730 may be performed by a scrambling sequence manager 835 as described with reference to FIG. 8.

At 1735, the method may include receiving at least a third communication based on the scrambling sequence. The operations of 1735 may be performed in accordance with examples as disclosed herein. In some examples, aspects of the operations of 1735 may be performed by a decoding manager 840 as described with reference to FIG. 8.

Figure 18:
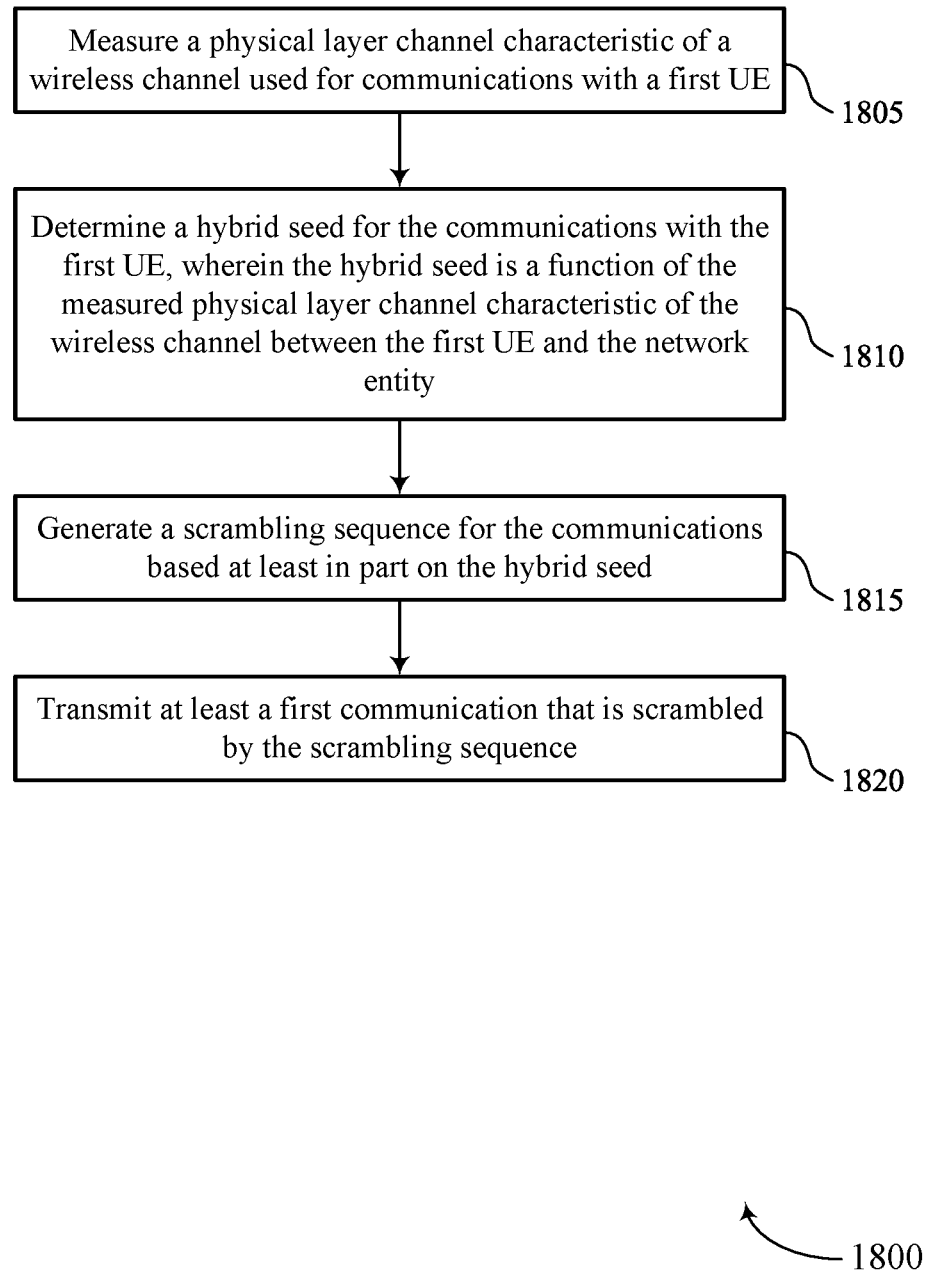

FIG. 18 shows a flowchart illustrating a method 1800 that supports channel scrambling techniques in wireless communications in accordance with one or more aspects of the present disclosure. The operations of the method 1800 may be implemented by a network entity or its components as described herein. For example, the operations of the method 1800 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1805, the method may include measuring a physical layer channel characteristic of a wireless channel used for communications with a first UE. The operations of 1805 may be performed in accordance with examples as disclosed herein. In some examples, aspects of the operations of 1805 may be performed by a measurement manager 1225 as described with reference to FIG. 12.

At 1810, the method may include determining a hybrid seed for the communications with the first UE, where the hybrid seed is a function of the measured physical layer channel characteristic of the wireless channel between the first UE and the network entity. The operations of 1810 may be performed in accordance with examples as disclosed herein. In some examples, aspects of the operations of 1810 may be performed by a hybrid seed manager 1230 as described with reference to FIG. 12.

At 1815, the method may include generating a scrambling sequence for the communications based on the hybrid seed. The operations of 1815 may be performed in accordance with examples as disclosed herein. In some examples, aspects of the operations of 1815 may be performed by a scrambling sequence manager 1235 as described with reference to FIG. 12.

At 1820, the method may include transmitting at least a first communication that is scrambled by the scrambling sequence. The operations of 1820 may be performed in accordance with examples as disclosed herein. In some examples, aspects of the operations of 1820 may be performed by an encoding manager 1240 as described with reference to FIG. 12.

The following provides an overview of aspects of the present disclosure:

Aspect 1: A method for wireless communication at a UE, comprising: measuring a physical layer channel characteristic of a wireless channel used for communications between the UE and a network entity; determining a hybrid seed for the communications between the UE and a network entity, wherein the hybrid seed is a function of the measured physical layer channel characteristic of the wireless channel between the UE and the network entity; generating a scrambling sequence for the communications based at least in part on the hybrid seed; and receiving at least a first communication based at least in part on the scrambling sequence.

Aspect 2: The method of aspect 1, wherein the receiving at least the first communication comprises: decoding one or more of a control channel payload or a DMRS based at least in part on the scrambling sequence that is generated from the hybrid seed.

Aspect 3: The method of any of aspects 1 through 2, wherein the generating the scrambling sequence comprises: identifying one or more upper layer initialization parameters (S) associated with the scrambling sequence; and generating the scrambling sequence based at least in part on a function of the upper layer initialization parameters and the hybrid seed.

Aspect 4: The method of aspect 3, wherein the one or more upper layer initialization parameters include a scrambling ID of the UE, a physical cell identification (PCID), or any combinations thereof, and wherein the measured physical layer channel characteristic is measured separately at the UE and at the network entity and channel reciprocity of the wireless channel provides that both the UE and the network entity obtain a same hybrid seed.

Aspect 5: The method of any of aspects 1 through 4, further comprising: determining, responsive to an indication from the network entity or a timer expiration, a new scrambling sequence based on an updated physical layer channel characteristic measurement and associated determined hybrid seed.

Aspect 6: The method of any of aspects 1 through 5, wherein the measuring the physical layer channel characteristic of the wireless channel uses a downlink reference signal associated with hybrid seed determination, and wherein the UE transmits an uplink reference signal to the network entity within a channel coherence time for determination of the hybrid seed at the network entity.

Aspect 7: The method of aspect 6, wherein the measured physical layer channel characteristic is one or more of a phase measurement, a received signal strength, an angle-of-arrival (AoA), an angle of departure (AoD), a measured channel matrix, or any combinations thereof.

Aspect 8: A method for wireless communication at a UE, comprising: transmitting a first communication to a network entity via a physical layer channel using a first phase offset value; receiving a second communication responsive to the first communication, the second communication transmitted using a second phase offset value that is based at least in part on a discrete phase offset value and an estimation of the first phase offset value, wherein the discrete phase offset value is a function of a hybrid seed used for scrambling communications on the physical layer channel; determining the discrete phase offset value based at least in part on a measured phase of the second communication and the first phase offset value; generating a scrambling sequence for the communications on the physical channel based at least in part on the hybrid seed, wherein the hybrid seed is determined based on the discrete phase offset value and the function; and receiving at least a third communication based at least in part on the scrambling sequence.

Aspect 9: The method of aspect 8, wherein the first phase offset value is selected randomly from range of available phase offset values, a beam used to transmit the first communication is selected randomly from a set of available beams, or any combinations thereof, for each instance of a transmission of the first communication to the network entity.

Aspect 10: The method of any of aspects 8 through 9, wherein the determining the discrete phase offset value comprises: measuring a received phase of the second communication; determining a difference between the received phase and the first phase offset value; and determining the discrete phase offset value based at least in part on the difference between the received phase and the first phase offset value.

Aspect 11: The method of any of aspects 8 through 10, wherein the second communication is transmitted via a plurality of frequency domain tones, and provides a discrete phase offset that is quantized by a plurality of bits.

Aspect 12: The method of any of aspects 8 through 11, further comprising: estimating an error of channel phase measurements for the physical layer channel; and suspending communications based on the hybrid seed when the error of channel phase measurements exceeds a threshold value.

Aspect 13: The method of any of aspects 8 through 12, further comprising: performing an CRC on a payload of the second communication based at least in part on the scrambling sequence; and transmitting a negative acknowledgment to the network entity responsive to a failure of the CRC.

Aspect 14: A method for wireless communication at a network entity, comprising: measuring a physical layer channel characteristic of a wireless channel used for communications with a first UE; determining a hybrid seed for the communications with the first UE, wherein the hybrid seed is a function of the measured physical layer channel characteristic of the wireless channel between the first UE and the network entity; generating a scrambling sequence for the communications based at least in part on the hybrid seed; and transmitting at least a first communication that is scrambled by the scrambling sequence.

Aspect 15: The method of aspect 14, further comprising: encoding one or more of a control channel payload or a DMRS of the first communication based at least in part on the scrambling sequence that is generated from the hybrid seed.

Aspect 16: The method of any of aspects 14 through 15, wherein the generating the scrambling sequence comprises: identifying one or more upper layer initialization parameters of the first UE that are associated with the scrambling sequence; and generating the scrambling sequence based at least in part on a function of the upper layer initialization parameters and the hybrid seed.

Aspect 17: The method of aspect 16, wherein the one or more upper layer initialization parameters include a scrambling ID of the first UE, a physical cell identification (PCID) associated with the network entity, or any combinations thereof, and wherein the measured physical layer channel characteristic is measured separately at the first UE and at the network entity and channel reciprocity of the wireless channel provides that both the first UE and the network entity obtain a same hybrid seed.

Aspect 18: The method of any of aspects 14 through 17, wherein the measured physical layer channel characteristic is one or more of a phase measurement, a received signal strength, an angle-of-arrival (AoA), an angle of departure (AoD), a measured channel matrix, or any combinations thereof.

Aspect 19: The method of any of aspects 14 through 18, further comprising: sharing the hybrid seed with at least a second UE.

Aspect 20: The method of aspect 19, wherein the sharing comprises: measuring a first phase offset value of a second communication from the second UE; determining a discrete phase offset value as a function of the hybrid seed; and transmitting, to the second UE, a third communication using a second phase offset value that is based at least in part on a discrete phase offset value and the measured first phase offset value.

Aspect 21: The method of aspect 20, wherein the third communication is transmitted via a plurality of frequency domain tones, and provides a discrete phase offset that is quantized by a plurality of bits.

Aspect 22: The method of any of aspects 14 through 21, further comprising: estimating an error of channel phase measurements for the wireless channel; and suspending communications based on the hybrid seed when the error of channel phase measurements exceeds a threshold value.

Aspect 23: The method of any of aspects 14 through 22, further comprising: determining an CRC value of a payload of the first communication based at least in part on the scrambling sequence; appending the CRC value to the payload of the first communication; and retransmitting the first communication responsive to an associated negative acknowledgment received from the first UE.

Aspect 24: An apparatus for wireless communication at a UE, comprising a processor; memory coupled with the processor; and instructions stored in the memory and executable by the processor to cause the apparatus to perform a method of any of aspects 1 through 7.

Aspect 25: An apparatus for wireless communication at a UE, comprising at least one means for performing a method of any of aspects 1 through 7.

Aspect 26: A non-transitory computer-readable medium storing code for wireless communication at a UE, the code comprising instructions executable by a processor to perform a method of any of aspects 1 through 7.

Aspect 27: An apparatus for wireless communication at a UE, comprising a processor; memory coupled with the processor; and instructions stored in the memory and executable by the processor to cause the apparatus to perform a method of any of aspects 8 through 13.

Aspect 28: An apparatus for wireless communication at a UE, comprising at least one means for performing a method of any of aspects 8 through 13.

Aspect 29: A non-transitory computer-readable medium storing code for wireless communication at a UE, the code comprising instructions executable by a processor to perform a method of any of aspects 8 through 13.

Aspect 30: An apparatus for wireless communication at a network entity, comprising a processor; memory coupled with the processor; and instructions stored in the memory and executable by the processor to cause the apparatus to perform a method of any of aspects 14 through 23.

Aspect 31: An apparatus for wireless communication at a network entity, comprising at least one means for performing a method of any of aspects 14 through 23.

Aspect 32: A non-transitory computer-readable medium storing code for wireless communication at a network entity, the code comprising instructions executable by a processor to perform a method of any of aspects 14 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    measuring, based at least in part on a downlink reference signal, a physical layer channel characteristic of a wireless channel used for communications between the UE and a network entity;
    determining a hybrid seed for the communications between the UE and the network entity, wherein the hybrid seed is a function of the measured physical layer channel characteristic of the wireless channel between the UE and the network entity, and wherein the hybrid seed is determined based at least in part on the downlink reference signal indicating that the measured physical layer channel characteristic is to be established as a basis for the hybrid seed;
    generating a scrambling sequence for the communications based at least in part on the hybrid seed; and
    receiving at least a first communication based at least in part on the scrambling sequence.

2. The method of claim 1, wherein the receiving at least the first communication comprises:
    decoding one or more of a control channel payload or a demodulation reference signal (DMRS) based at least in part on the scrambling sequence that is generated from the hybrid seed.

3. The method of claim 1, wherein the generating the scrambling sequence comprises:
    identifying one or more upper layer initialization parameters(S) associated with the scrambling sequence; and
    generating the scrambling sequence based at least in part on a function of the upper layer initialization parameters and the hybrid seed.

4. The method of claim 3, wherein the one or more upper layer initialization parameters include a scrambling ID of the UE, a physical cell identification (PCID), or any combinations thereof, and wherein the measured physical layer channel characteristic is measured separately at the UE and at the network entity and channel reciprocity of the wireless channel provides that both the UE and the network entity obtain a same hybrid seed.

5. The method of claim 1, further comprising:
    determining, responsive to an indication from the network entity or a timer expiration, a new scrambling sequence based on an updated physical layer channel characteristic measurement and associated determined hybrid seed.

6. The method of claim 1, wherein the measuring the physical layer channel characteristic of the wireless channel uses a downlink reference signal associated with hybrid seed determination, and wherein the UE transmits an uplink reference signal to the network entity within a channel coherence time for determination of the hybrid seed at the network entity.

7. The method of claim 6, wherein the measured physical layer channel characteristic is one or more of a phase measurement, a received signal strength, an angle-of-arrival (AoA), an angle of departure (AoD), a measured channel matrix, or any combinations thereof.

8. A method for wireless communication at a user equipment (UE), comprising:
    transmitting a first communication to a network entity via a physical layer channel using a first phase offset value;
    receiving a second communication responsive to the first communication, the second communication transmitted using a second phase offset value that is based at least in part on a discrete phase offset value and an estimation of the first phase offset value, wherein the discrete phase offset value is a function of a hybrid seed used for scrambling communications on the physical layer channel;
    determining the discrete phase offset value based at least in part on a measured phase of the second communication and the first phase offset value;
    generating a scrambling sequence for the communications on the physical channel based at least in part on the hybrid seed, wherein the hybrid seed is determined based on the discrete phase offset value and the function; and
    receiving at least a third communication based at least in part on the scrambling sequence.

9. The method of claim 8, wherein the first phase offset value is selected randomly from range of available phase offset values, a beam used to transmit the first communication is selected randomly from a set of available beams, or any combinations thereof, for each instance of a transmission of the first communication to the network entity.

10. The method of claim 8, wherein the determining the discrete phase offset value comprises:
    measuring a received phase of the second communication;
    determining a difference between the received phase and the first phase offset value; and
    determining the discrete phase offset value based at least in part on the difference between the received phase and the first phase offset value.

11. The method of claim 8, wherein the second communication is transmitted via a plurality of frequency domain tones, and provides a discrete phase offset that is quantized by a plurality of bits.

12. The method of claim 8, further comprising:
    estimating an error of channel phase measurements for the physical layer channel; and
    suspending communications based on the hybrid seed when the error of channel phase measurements exceeds a threshold value.

13. The method of claim 8, further comprising:
performing a cyclic redundancy check (CRC) on a payload of the second communication based at least in part on the scrambling sequence; and
transmitting a negative acknowledgment to the network entity responsive to a failure of the CRC.

14. A method for wireless communication at a network entity, comprising:
measuring a physical layer channel characteristic of a wireless channel used for communications with a first user equipment (UE);
determining a hybrid seed for the communications with the first UE, wherein the hybrid seed is a function of the measured physical layer channel characteristic of the wireless channel between the first UE and the network entity, and wherein the hybrid seed is determined based at least in part on a downlink reference signal indicating that the measured physical layer channel characteristic is to be established as a basis for the hybrid seed;
generating a scrambling sequence for the communications based at least in part on the hybrid seed; and
transmitting at least a first communication that is scrambled by the scrambling sequence.

15. The method of claim 14, further comprising:
encoding one or more of a control channel payload or a demodulation reference signal (DMRS) of the first communication based at least in part on the scrambling sequence that is generated from the hybrid seed.

16. The method of claim 14, wherein the generating the scrambling sequence comprises:
identifying one or more upper layer initialization parameters of the first UE that are associated with the scrambling sequence; and
generating the scrambling sequence based at least in part on a function of the upper layer initialization parameters and the hybrid seed.

17. The method of claim 16, wherein the one or more upper layer initialization parameters include a scrambling ID of the first UE, a physical cell identification (PCID) associated with the network entity, or any combinations thereof, and wherein the measured physical layer channel characteristic is measured separately at the first UE and at the network entity and channel reciprocity of the wireless channel provides that both the first UE and the network entity obtain a same hybrid seed.

18. The method of claim 14, wherein the measured physical layer channel characteristic is one or more of a phase measurement, a received signal strength, an angle-of-arrival (AoA), an angle of departure (AoD), a measured channel matrix, or any combinations thereof.

19. The method of claim 14, further comprising:
sharing the hybrid seed with at least a second UE.

20. The method of claim 19, wherein the sharing comprises:
measuring a first phase offset value of a second communication from the second UE;
determining a discrete phase offset value as a function of the hybrid seed; and
transmitting, to the second UE, a third communication using a second phase offset value that is based at least in part on a discrete phase offset value and the measured first phase offset value.

21. The method of claim 20, wherein the third communication is transmitted via a plurality of frequency domain tones, and provides a discrete phase offset that is quantized by a plurality of bits.

22. The method of claim 14, further comprising:
estimating an error of channel phase measurements for the wireless channel; and suspending communications based on the hybrid seed when the error of channel phase measurements exceeds a threshold value.

23. The method of claim 14, further comprising:
determining a cyclic redundancy check (CRC) value of a payload of the first communication based at least in part on the scrambling sequence;
appending the CRC value to the payload of the first communication; and
retransmitting the first communication responsive to an associated negative acknowledgment received from the first UE.

24. An apparatus for wireless communication at a user equipment (UE), comprising:
one or more processors;
one or more memories coupled with the one or more processors; and
instructions stored in the one or more memories and executable by the one or more processors to cause the apparatus to:
measure a physical layer channel characteristic of a wireless channel used for communications between the UE and a network entity;
determine a hybrid seed for the communications between the UE and the network entity, wherein the hybrid seed is a function of the measured physical layer channel characteristic of the wireless channel between the UE and the network entity;
generate a scrambling sequence for the communications based at least in part on the hybrid seed; and
receive at least a first communication based at least in part on the scrambling sequence.

25. The apparatus of claim 24, wherein the instructions to receive at least the first communication are executable by the one or more processors to cause the apparatus to:
decode one or more of a control channel payload or a demodulation reference signal (DMRS) based at least in part on the scrambling sequence that is generated from the hybrid seed.

26. The apparatus of claim 24, wherein the instructions to generate the scrambling sequence are executable by the one or more processors to cause the apparatus to:
identify one or more upper layer initialization parameters (S) associated with the scrambling sequence; and
generate the scrambling sequence based at least in part on a function of the one or more upper layer initialization parameters and the hybrid seed.

27. The apparatus of claim 26, wherein the one or more upper layer initialization parameters include a scrambling ID of the UE, a physical cell identification (PCID), or any combinations thereof, and wherein the measured physical layer channel characteristic is measured separately at the UE and at the network entity and channel reciprocity of the wireless channel provides that both the UE and the network entity obtain a same hybrid seed.

28. The apparatus of claim 24, wherein the instructions are further executable by the one or more processors to cause the apparatus to:
determine, responsive to an indication from the network entity or a timer expiration, a new scrambling sequence based on an updated physical layer channel characteristic measurement and associated determined hybrid seed.

29. The apparatus of claim 24, wherein the measuring the physical layer channel characteristic of the wireless channel uses a downlink reference signal associated with hybrid seed determination, and wherein the UE transmits an uplink reference signal to the network entity within a channel coherence time for determination of the hybrid seed at the network entity.

30. The apparatus of claim 29, wherein the measured physical layer channel characteristic is one or more of a phase measurement, a received signal strength, an angle-of-arrival (AoA), an angle of departure (AoD), a measured channel matrix, or any combinations thereof.

* * * * *